(12) United States Patent
Goenka et al.

(10) Patent No.: US 11,943,310 B2
(45) Date of Patent: Mar. 26, 2024

(54) PERFORMING OPERATIONS BASED UPON ACTIVITY PATTERNS

(71) Applicant: c/o Verizon Media Inc., New York, NY (US)

(72) Inventors: Mohit Goenka, Santa Clara, CA (US); Ashish Khushal Dharamshi, Sunnyvale, CA (US); Nikita Varma, Milpitas, CA (US); Gnanavel Shanmugam, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 27 days.

(21) Appl. No.: 17/409,722

(22) Filed: Aug. 23, 2021

(65) Prior Publication Data

US 2021/0385289 A1 Dec. 9, 2021

Related U.S. Application Data

(62) Division of application No. 16/233,564, filed on Dec. 27, 2018, now Pat. No. 11,102,315.

(51) Int. Cl.
| | |
|---|---|
| *H04L 67/50* | (2022.01) |
| *H04L 51/08* | (2022.01) |
| *H04L 51/214* | (2022.01) |
| *H04L 51/234* | (2022.01) |
| *H04L 67/306* | (2022.01) |

(52) U.S. Cl.
CPC ............ *H04L 67/535* (2022.05); *H04L 51/08* (2013.01); *H04L 51/214* (2022.05); *H04L 51/234* (2022.05); *H04L 67/306* (2013.01)

(58) Field of Classification Search
None
See application file for complete search history.

(56) References Cited

U.S. PATENT DOCUMENTS

| | | | |
|---|---|---|---|
| 2015/0213372 A1* | 7/2015 | Shah | H04L 51/52 706/12 |
| 2019/0158610 A1* | 5/2019 | Holzband | H04L 51/216 |

* cited by examiner

*Primary Examiner* — Jeffrey R Swearingen
(74) *Attorney, Agent, or Firm* — Cooper Legal Group LLC

(57) ABSTRACT

One or more computing devices, systems, and/or methods for determining activity patterns based upon user activity and/or performing operations based upon the activity patterns are provided. For example, activity performed using a communication interface associated with a user account may be detected. The activity may be analyzed to determine an activity pattern associated with a first set of conditions. The activity pattern may be stored in a user profile associated with the user account. The user profile may comprise a plurality of activity patterns. Each activity pattern of the plurality of activity patterns may be associated with a set of conditions of a plurality of sets of conditions. It may be determined that the first set of conditions are met. Responsive to determining that the first set of conditions are met, one or more operations associated with the activity pattern may be performed.

20 Claims, 18 Drawing Sheets

US 11,943,310 B2

PERFORMING OPERATIONS BASED UPON ACTIVITY PATTERNS

RELATED APPLICATION

This application claims priority to and is a divisional of U.S. application Ser. No. 16/233,564, filed on Dec. 27, 2018, entitled "PERFORMING OPERATIONS BASED UPON ACTIVITY PATTERNS", which is incorporated by reference herein in its entirety.

BACKGROUND

Many applications, such as email applications, instant messaging applications, social network applications, browser applications, etc. may allow a user to create an account for performing communications with contacts using a communication interface. For example, the communication interface may be used for drafting and/or sending emails, messages, social media posts, etc. and/or for receiving and/or consuming emails, messages, social media posts, etc.

SUMMARY

In accordance with the present disclosure, one or more computing devices and/or methods are provided. In an example, first activity performed using a communication interface on a first client device associated with a first user account may be detected. The first activity may be analyzed to determine a first activity pattern associated with a first set of conditions. The first activity pattern may be stored in a first user profile associated with the first user account. The first user profile may comprise a plurality of activity patterns. Each activity pattern of the plurality of activity patterns may be associated with a set of conditions of a plurality of sets of conditions. It may be determined that the first set of conditions are met. Responsive to determining that the first set of conditions are met, one or more operations associated with the first activity pattern may be performed.

In an example, a first email received by a first email account may be identified. The first email may be received from a second email account. The first email may be analyzed to determine whether the first email is unanswered. Responsive to determining that the first email is unanswered, a notification may be transmitted to a first client device associated with the first email account. The notification may be indicative of the first email being unanswered. A request to compose a reply email in response to the first email may be received via a selection of a selectable input of the notification. Responsive to receiving the request to compose the reply email in response to the first email, an email drafting interface may be displayed using the first client device. A first email header field of the email drafting interface, corresponding to a recipient email address, may comprise an email address of the second email account. A second email header field of the email drafting interface, corresponding to an email subject, may comprise a subject line indicative of the reply email being a response to the first email.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
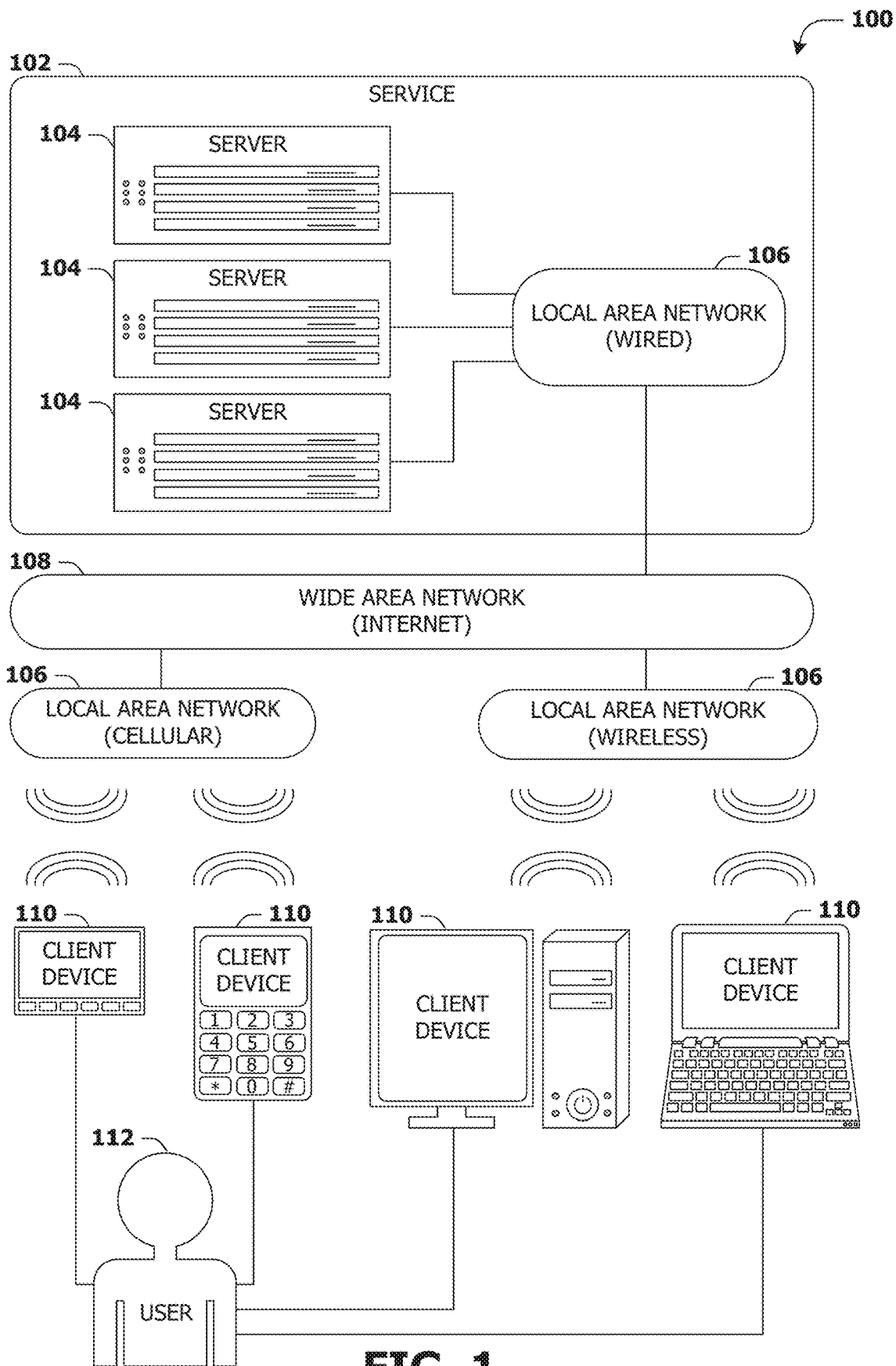
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
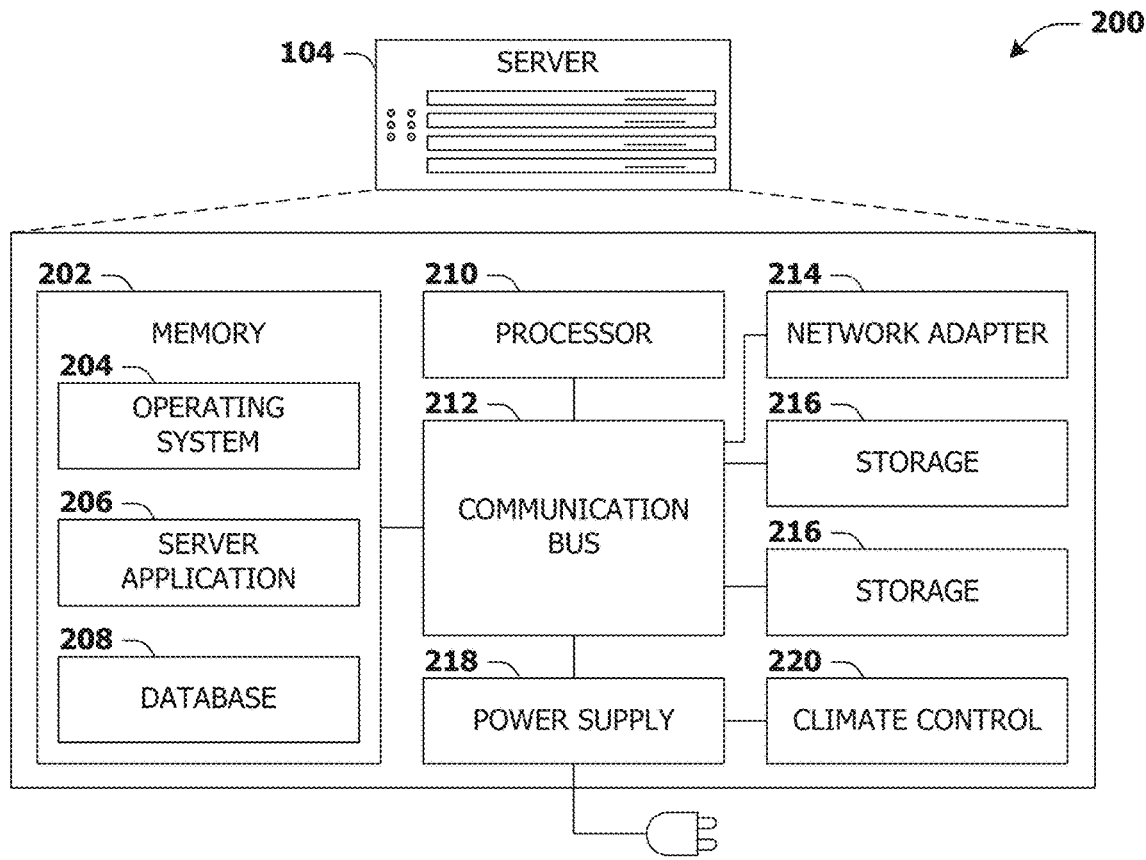
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
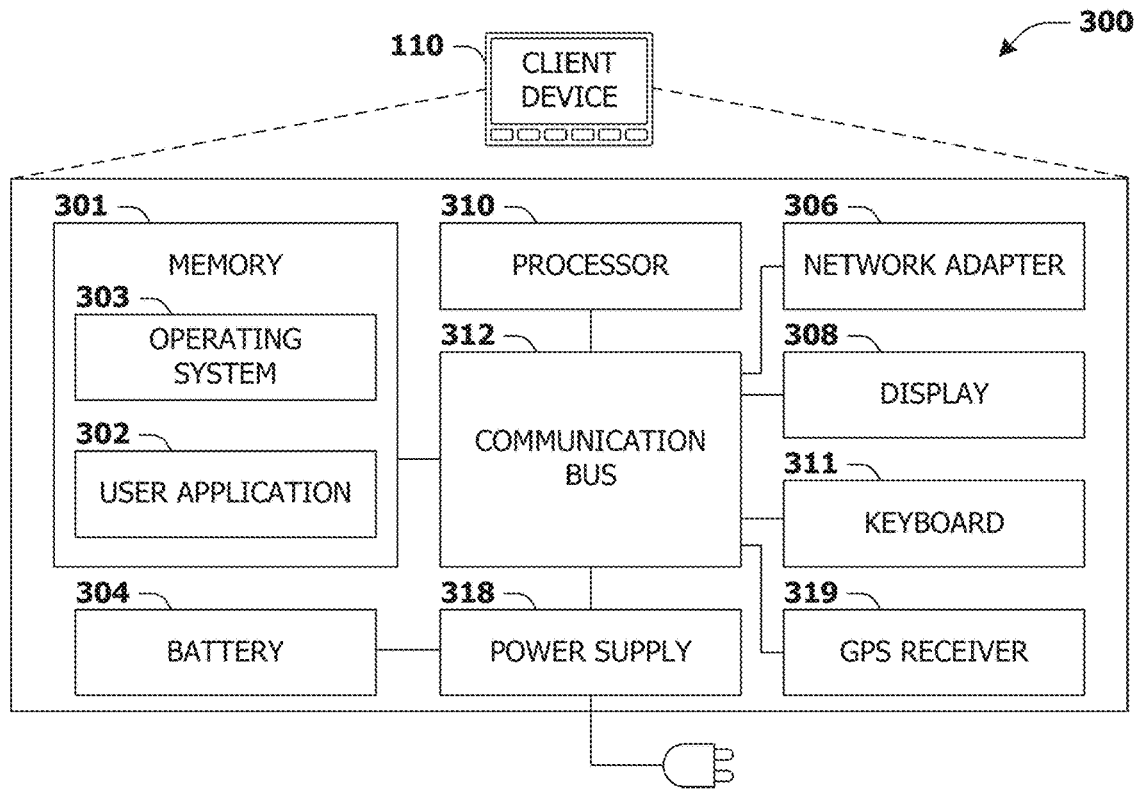
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining activity patterns based upon user activity and/or performing operations based upon the activity patterns are provided. For example, a user may access and/or interact with a communication interface (e.g., an email interface, a messaging interface, a social network interface, etc.) for sending and/or receiving emails, uploading social media posts, and/or performing communications via messaging, voice calls, video calls, etc. In some examples, the communication interface may be accessed and/or interacted with using a plurality of devices associated with a user account of the user.

In accordance with one or more of the techniques presented herein, activity performed using the communication interface may be analyzed to determine a plurality of activity patterns associated with the activity. For example, each activity pattern may be associated with a set of conditions of a plurality of sets of conditions. For example, each activity pattern of the plurality of activity patterns may correspond to one or more interactions with the communication interface (e.g., a navigational interaction where a message and/or a portion of the communication interface is opened, one or more interactions associated with transmitting an email of a first type, etc.) and/or one or more actions using the communication interface that occur when a set of conditions of a plurality of sets of conditions are met. In some examples, it may be determined that a first set of conditions corresponding to a first activity pattern of the plurality of activity patterns are met. Responsive to determining that the first set of conditions are met, one or more operations associated with the first activity pattern may be performed (automatically), such that the user may not have to spend time and/or energy to perform the one or more operations manually.

Figure 4A:
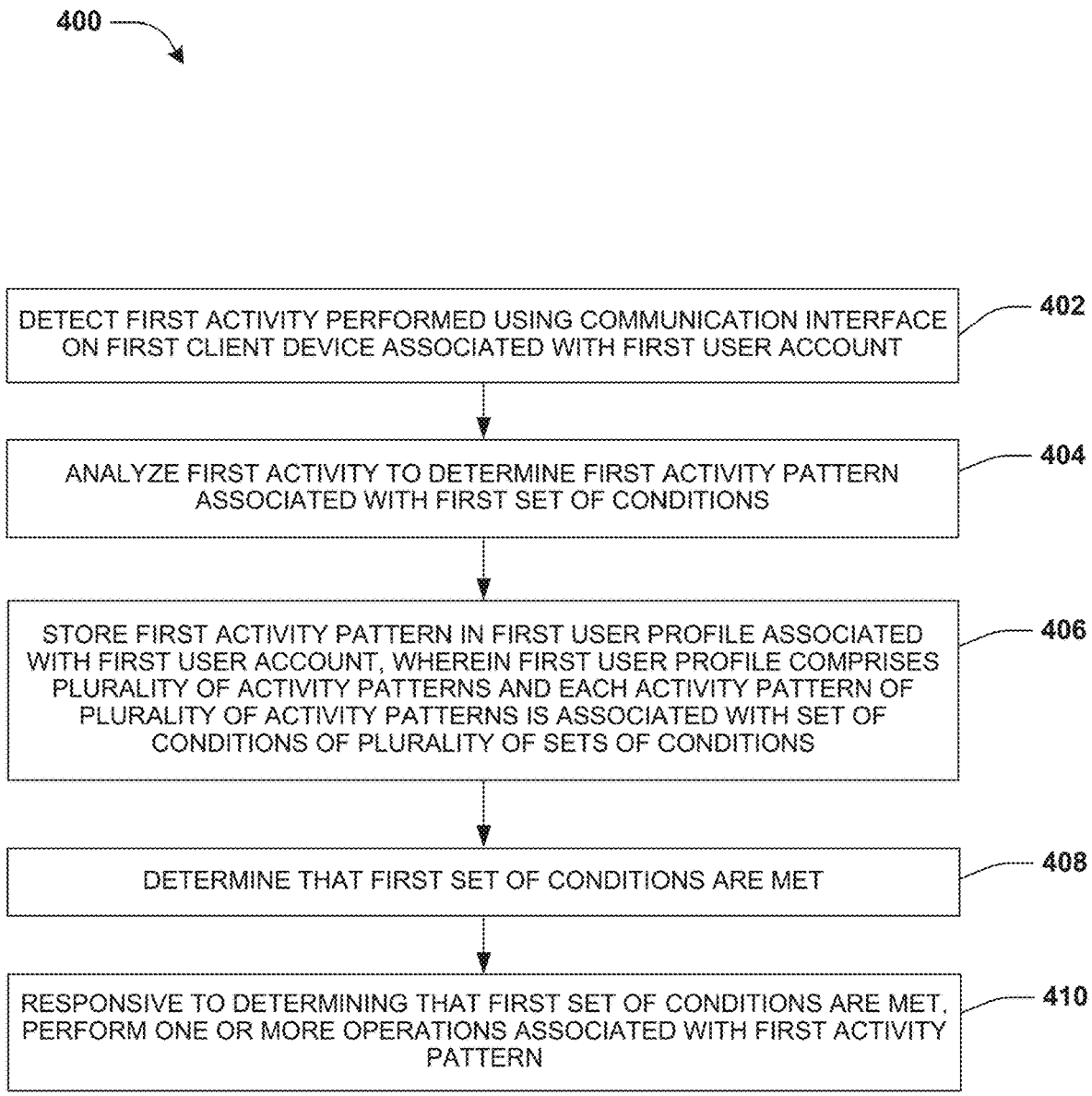
FIG. 4A is a flow chart illustrating an example method for determining activity patterns based upon user activity and/or performing operations based upon the activity patterns.

An embodiment of determining activity patterns based upon user activity and/or performing operations based upon the activity patterns is illustrated by an example method 400 of FIG. 4A. A first user, such as user Jill, and/or a first client device associated with the first user may access and/or interact with a first communication interface (e.g., an email interface, a messaging interface, a social network interface, etc.) for sending and/or receiving emails, uploading social media posts, and/or performing communications via messaging, voice calls, video calls, etc. The first communication interface may be associated with a communication system (e.g., an email service provider, a communication service provider, etc.).

For example, a first user account (e.g., one or more of an email account, a messaging account, a social media account, etc.) of the communication system may be accessed and/or interacted with via the first communication interface. The first communication interface may be an email client, a messaging client, a web interface accessed via a browser (e.g., a web email interface, a web messaging interface, a web social media interface, etc.), an application (e.g., an email application, a messaging application, a social media application, etc.), etc.

A graphical user interface of the first client device may be controlled to display the first communication interface. For example, a plurality of messages (e.g., a plurality of emails, a plurality of instant messages, etc.) associated with the first user account may be accessed using the first communication interface. For example, a portion of the plurality of messages may be messages that are transmitted by the first user account to one or more user accounts (e.g., sent messages). Alternatively and/or additionally, a portion of the plurality of messages may be messages that are received by the first user account from one or more user accounts (e.g., received messages).

The plurality of messages may be displayed and/or consumed using the first communication interface (e.g., messages may be displayed responsive to selections of selectable inputs of the first communication interface). In some examples, messages (e.g., emails, instant messages, social media posts, etc.) may be composed and/or transmitted to one or more user accounts using the first communication interface. Alternatively and/or additionally, settings associated with the first communication interface and/or the first user account may be managed and/or modified using the first communication interface (e.g., interface template settings, color settings, reply-to settings, privacy settings, etc. may be managed and/or modified using the first communication interface).

At 402, first activity performed using the first communication interface may be detected. For example, the first activity may comprise selectable inputs of the first communication interface being selected (e.g., clicked, pressed, etc.) using one or more of a touchscreen of the first client device, one or more switches (e.g., one or more buttons) of the first client device, a conversational interface (e.g., a voice recognition and natural language interface) of the first client device, etc. For example, the selectable inputs may correspond to one or more of one or more messages of the plurality of messages (e.g., emails, instant messages, multimedia messages, social media posts, etc. may be opened using the selectable inputs), one or more settings associated with the first user account and/or the first communication interface (e.g., interface template settings, color settings, reply-to settings, etc.), one or more actions (e.g., composing a message, transmitting a message, deleting a message, replying to a message, forwarding a message, opening a message, initiating an audio call, initiating a video call, etc.), etc.

In some examples, the first activity may include activity performed using one or more communication interfaces different than the first communication interface. For example, the one or more communication interfaces and/or the first communication interface may be associated with the communication system. Each communication interface may be associated with a service, of a plurality of services, provided by the system. For example, the system may be an internet system providing a plurality of communication interfaces, where each communication interface of the plurality of communication interfaces may provide a service of the plurality of services (e.g., an email service, a messaging service, a social media service, a video calling service, an audio calling service, etc.).

Alternatively and/or additionally, the first activity may include activity performed using one or more client devices, different than the first client device. For example, a plurality of client devices, comprising the one or more client devices and/or the first client device, may be associated with the first user account. For example, each client device the one or more client devices may have the first communication interface installed (e.g., a version of the first communication interface associated with a client device of the one or more client devices may be installed on the client device). Alternatively and/or additionally, the first communication interface may be a web interface accessed via a browser of the first client device and/or the one or more client devices.

At 404, the first activity may be analyzed to determine a first activity pattern associated with a first set of conditions. In some examples, the first activity pattern may be indicative of user behavior associated with the first user. For example, the first activity pattern may be indicative of one or more first actions that are performed (by the first user) using the first communication interface when the first set of conditions are met. For example, the one or more actions may be performed one or more times during the first activity.

For example, the one or more first actions may correspond to one or more first interactions with the first communication interface. For example, the one or more first interactions may comprise a selection of a first exemplary selectable input of the first communication interface. The first exemplary selectable input may be a selectable input corresponding to an inbox of the first user account (e.g., the inbox may be opened responsive to a selection of the selectable input). Alternatively and/or additionally, the first exemplary selectable input may be a selectable input corresponding to composing a message (e.g., the email drafting interface may be opened responsive to a selection of the selectable input).

Alternatively and/or additionally, the first exemplary selectable input may be a selectable input corresponding to a request to display a message (e.g., the message may be displayed responsive to a selection of the selectable input). Alternatively and/or additionally, the first exemplary selectable input may be a selectable input corresponding to labelling a message (e.g., placing the message in an organization folder, such as a folder associated with a type of the message, a subject of the message, a user account that the message is received from, etc.).

Alternatively and/or additionally, the one or more first interactions may comprise a first navigational interaction. The first navigational interaction may correspond to accessing a part of the first communication interface (e.g., switching screens from a first exemplary part of the first communication interface to a second exemplary part of the first communication interface) and/or accessing a resource associated with the first user account (e.g., opening a screen comprising the resource). For example, the first navigational interaction may correspond to navigating to the inbox of the first user account (e.g., opening a screen comprising the inbox of the first user account). Alternatively and/or additionally, the first navigational interaction may correspond to navigating to a message drafting interface of the first communication interface (e.g., opening a screen comprising an interface for composing a message). Alternatively and/or additionally, the first navigational interaction may correspond to navigating to a message associated with (e.g., received by and/or transmitted by) the first user account (e.g., opening a screen comprising the message).

Alternatively and/or additionally, the one or more first actions may comprise a first drafting action. For example, the first drafting action may be performed using a message drafting interface of the first communication interface. In some examples, the message drafting interface may be used to draft messages (e.g., draft instant messages, draft text messages, draft social media posts, draft (e.g., compose) emails). Alternatively and/or additionally, the message drafting interface may be used to transmit messages to user accounts. For example, a drafted message may be transmitted to one or more user accounts using the message drafting interface. The first drafting action may correspond to inputting (e.g., typing, copy and pasting, etc.) a set of text into the message drafting interface. Alternatively and/or additionally, the first drafting action may correspond to inputting one or more content items (e.g., images, videos, animations, graphics interchange format (GIF) animations, audio files, files, etc.) into the message drafting interface. Alternatively and/or additionally, the first drafting action may correspond to attaching one or more files (e.g., email attachments) to a message using the message drafting interface.

Alternatively and/or additionally, the one or more first actions may comprise a first transmitting action. For example, the first transmitting action may be performed using the message drafting interface. For example, the first transmitting action may correspond to transmitting a message to one or more user accounts. Alternatively and/or additionally, the one or more first actions may comprise a first forwarding action. For example, the first forwarding action may correspond to forwarding a message to one or more user accounts. Alternatively and/or additionally, the one or more first actions may comprise a first deleting action. For example, the first deleting action may correspond to deleting a message of the first user account.

In some examples, the first set of conditions may correspond to one or more second actions performed using the first communication interface. For example, the first activity may comprise the one or more second actions being performed using the first communication interface. The first activity pattern may correspond to the one or more second actions being performed prior to the one or more first actions (e.g., the one or more first actions may typically be performed upon completion of the one or more second actions).

For example, the one or more second actions may comprise a selection of a second exemplary selectable input (e.g., the second exemplary selectable input may correspond to opening the inbox of the first user account, composing a message, a request to display a message, etc.).

Alternatively and/or additionally, the one or more second actions may comprise a second navigational action. The second navigational action may correspond to accessing a part of the first communication interface and/or accessing a resource associated with the first user account. Alternatively and/or additionally, the second navigational action may correspond to the first communication interface being opened (e.g., a request to open the first communication interface and/or access the first user account may be received from the first client device). Alternatively and/or additionally, the second navigational action may correspond to navigating to the inbox of the first user account, navigating to a message drafting interface of the first communication interface, navigating to a message associated with the first user account, etc.

Alternatively and/or additionally, the one or more second actions may comprise a second drafting action. For example, the second drafting action may be performed using the message drafting interface of the first communication interface. The second drafting action may correspond to inputting a set of text into the message drafting interface, inputting one or more content items into the message drafting interface, attaching one or more files (e.g., email attachments) to a message using the message drafting interface, etc. Alternatively and/or additionally, the one or more second actions may comprise transmitting a message to one or more user accounts, forwarding a message to one or more user accounts, deleting a message of the first user account, etc.

In some examples, the first activity pattern may be indicative of a first sequence of actions comprising the one or more second actions (corresponding to the first set of conditions) and/or the one or more first actions. For example, the first sequence of actions may correspond to the one or more second actions preceding the one or more first actions. For example, a plurality of pattern instances corresponding to the first activity pattern may be detected (during the first activity). For example, each pattern instance of the plurality of pattern instances may correspond to a set of (continuous) activity, (performed during the first activity) corresponding to the first sequence of actions. For example, each pattern instance of the plurality of pattern instances may correspond to a set of activity where the one or more second actions are performed and/or after the one or more second actions are performed, the one or more first actions are performed.

In a first example, the one or more second actions (corresponding to the first set of conditions) may comprise the first communication interface being opened. In some examples, a list of messages (e.g., an inbox of the first user account) may be displayed responsive to the first communication interface being opened. Alternatively and/or additionally, the one or more first actions may comprise an exemplary message that is a first type of message being opened. For example, an exemplary message that is the first type of message may be opened responsive to a selection of the exemplary message from the list of messages. The first type of message may correspond to a most recently received unread message of the plurality of messages associated with the first user account (e.g., a newest unread message, for example). For example, the first sequence of actions associated with the first activity pattern may comprise the first communication interface being opened, followed by the exemplary message that is the first type of message being opened. In some examples, one or more sets of activity, corresponding to the first sequence of actions, may be detected while monitoring the second activity.

In a second example, the one or more second actions may comprise a first exemplary set of text being inputted into a first input field (e.g., a subject line field, a message body field, etc.) of the message drafting interface. Alternatively and/or additionally, the one or more first actions may be associated with a second exemplary set of text being inputted into a second input field of the message drafting interface. Alternatively and/or additionally, the one or more first actions may be associated with an exemplary content item (e.g., an image, a video, an animation, a GIF animation, an audio file, etc.) being inputted into a third input field (and/or the second input field) of the message drafting interface.

In some examples, the first exemplary set of text, the second exemplary set of text and/or the exemplary content item may be associated with a first exemplary topic (e.g., the first exemplary topic may be associated with one or more of a birthday, a holiday, an occasion, condolences, etc.). The first activity pattern and/or the first exemplary topic may be determined based upon a first set of messages transmitted to one or more first user accounts. For example, the first activity may comprise the first set of messages being transmitted to the one or more first user accounts. In some examples, messages of the first set of messages may comprise sets of text associated with the first exemplary topic. For example, the first set of messages may be analyzed to determine the first exemplary set of text (associated with the one or more second actions).

For example, the first exemplary topic may be associated with a birthday message. The first exemplary set of text may comprise "Happy Birthday", the second exemplary set of text may comprise text associated with the first exemplary topic (e.g., "I wish you best wishes on your birthday") and/or the exemplary content item may comprise an image associated with the first exemplary topic (e.g., an image of a birthday cake, for example). Accordingly, the first sequence of actions associated with the first activity pattern may comprise the first exemplary set of text being inputted into the message drafting interface, followed by the second exemplary set of text and/or the exemplary content item being inputted into the message drafting interface.

In a third example, the one or more second actions may comprise an exemplary message that is a second type of message being opened. For example, the second type of message may correspond to a work-related message. Alternatively and/or additionally, the one or more second actions may (further) comprise a selection of an exemplary reply selectable input corresponding to drafting and/or transmitting an exemplary reply message as a response to the exemplary message. Alternatively and/or additionally, the one or more second actions may (further) comprise the message drafting interface being opened for drafting the exemplary reply message.

Alternatively and/or additionally, the one or more first actions may comprise opening an attachment interface and/or attaching one or more files to the exemplary reply message using the attachment interface. Accordingly, the first sequence of actions associated with the first activity pattern may comprise the second type of message being opened, the selection of the exemplary reply selectable input and/or the message drafting interface being opened for drafting the exemplary reply message, followed by the attachment interface being opened and/or the one or more files being attached to the exemplary reply message.

In some examples, the first set of conditions may correspond to one or more first conditions associated with the first activity pattern. For example, it may be determined that the one or more first actions are performed at times determined to meet the one or more first conditions. In some examples, the one or more first conditions may comprise a first condition associated with a first time of day. For example, the one or more first actions may be performed during the first time of day (e.g., early morning (5:00 AM-8:00 AM), morning (8:00 AM-11:00 AM), noon (11:00 AM-1:00 PM), afternoon (1:00 PM-5:00 PM), early evening (5:00 PM-7:00 PM), evening (7:00 PM-11:00 PM), late night (11:00 PM-5:00 AM), etc.).

Alternatively and/or additionally, the one or more first conditions may comprise a second condition associated with a first set of weather characteristics. For example, the one or more first actions may be performed while the first client device (and/or a different client device associated with the first user account) is in a region determined to have the first set of weather characteristics (e.g., rainy, sunny, cloudy, snowy, cold, warm, windy, etc.).

Alternatively and/or additionally, the one or more first conditions may comprise a third condition associated with a first location. For example, the one or more first actions may be performed while the first client device (and/or a different client device associated with the first user account) is at the first location (e.g., the first location may be associated with a workplace of the first user, the first location may be associated with a home of the first user, the first location may be associated with a shopping center, the first location may be associated with a park, the first location may be associated with outside of the workplace of the first user, the first location may be associated with outside of the home of the first user, etc.).

Alternatively and/or additionally, the one or more first conditions may comprise a fourth condition associated with an occasion (e.g., a birthday, a holiday, an event, etc.). For example, the one or more first actions may be performed at times associated with the occasion (e.g., birthday messages may be transmitted during birthdays associated with user accounts, new year messages may be transmitted at a time associated with New Year's Day, etc.).

In some examples, the first set of conditions may be indicative of a combination of the one or more first conditions and the one or more second actions. For example, the first set of conditions may be met when the one or more first conditions are met and the one or more second actions are performed.

In a fourth example, the one or more second actions may comprise the first communication interface being opened. Alternatively and/or additionally, the one or more first conditions may be associated with the first time of day (e.g., morning (8:00 AM-11:00 AM)). Alternatively and/or additionally, the one or more first actions may comprise an exemplary message that is the first type of message being opened. Accordingly, the first activity pattern may be indicative of the first communication interface being opened, followed by the exemplary message being opened, during the first time of day (e.g., the first sequence of actions may comprise the first communication interface being opened, followed by the exemplary message being opened, during the first time of day). For example, the first activity pattern may be associated with the one or more first conditions, the one or more second actions and the one or more first actions.

Alternatively and/or additionally, the first set of conditions may be indicative of merely the one or more first conditions. For example, the first set of conditions may be met when the one or more first conditions are met.

In a fifth example, the one or more first conditions may be indicative of an exemplary occasion (e.g., an exemplary birthday) associated with an exemplary user account that is a first type of user account. For example, the first type of user account may correspond to a type of relationship between the first user and an exemplary user associated with the exemplary user account (e.g., familial relationship, social relationship, coworker relationship, business relationship, etc.). Alternatively and/or additionally, the first type of user account may correspond to a level of communication between the first user account and the exemplary user account.

Alternatively and/or additionally, the one or more first actions may comprise drafting an exemplary occasion-related message (e.g., happy birthday message) and/or transmitting the exemplary occasion-related birthday message to the exemplary user account. For example, the first activity may comprise a second set of messages being transmitted to one or more user accounts. The second set of messages (e.g., content of the second set of messages) may be analyzed to determine that messages of the second set of messages are associated with a second exemplary topic (e.g., the second set of messages may be occasion-related messages).

Alternatively and/or additionally, times of transmission of the second set of messages may be analyzed to determine that messages of the second set of messages are transmitted during occasions (e.g., birthdays) associated with the one or more user accounts. Alternatively and/or additionally, the one or more user accounts may be analyzed (e.g., messages associated with the one or more user accounts, social media profiles associated with the one or more user accounts, communications between the first user account and the one or more user accounts, etc. may be analyzed) to determine the first type of user account that the second set of messages are transmitted to.

Accordingly, the first activity pattern may be indicative of the exemplary occasion-related message (e.g., happy birthday message) being drafted and/or transmitted to an exemplary user account that is the first type of user account, during a time associated with an exemplary occasion associated with the exemplary user account (e.g., the first sequence of actions may comprise the exemplary occasion-related message being drafted and/or transmitted to an exemplary user account that is the first type of user account, during a time associated with an exemplary occasion associated with the exemplary user account). For example, the first activity pattern may be associated with the one or more first conditions and the one or more first actions.

Alternatively and/or additionally, the first set of conditions may be indicative of merely the one or more second actions. For example, the first set of conditions may be met when the one or more second actions are performed (e.g., the first set of conditions may be met upon completion of the one or more second actions). For example, the first activity pattern may be associated with the one or more second actions and the one or more first actions.

In some examples, a set of activity (e.g., a portion of the first activity) may be determined to be a pattern instance (of the plurality of pattern instances) corresponding to the first activity pattern if the set of activity comprises the one or more second actions being performed prior to the one or more first actions. For example, a set of activity may be determined to be a pattern instance corresponding to the first activity pattern if the set of activity comprises the one or more second actions and the one or more first actions being performed consecutively (and/or that the one or more second actions are performed prior to the one or more first actions).

Alternatively and/or additionally, a set of activity may be determined to be a pattern instance corresponding to the first activity pattern if the set of activity comprises the one or more first actions being performed immediately following the one or more second actions. For example, it may be determined that the set of activity comprises the one or more first actions being performed immediately following the one or more second actions if 0 actions (different than the one or more second actions and/or the one or more first actions) are performed between the one or more second actions and the one or more first actions. In an example, the first user may open the first communication interface. Then, the first user may open a message that is the first type of message. Between the first user opening the first communication interface and the first user opening the message, 0 different actions may be performed (by the first user).

Alternatively and/or additionally, a set of activity may be determined to be a pattern instance corresponding to the first activity pattern if the set of activity comprises the one or more first actions being performed following the one or more second actions and/or that a quantity of different actions performed in between the one or more second actions and the one or more first actions being performed is less than a threshold quantity of different actions. For example, the quantity of different actions may correspond to a quantity of actions of different actions (e.g., actions different than the one or more second actions and/or different than the one or more first actions) that are performed after the one or more second actions are performed and/or before the one or more first actions are performed. In an example, the first user may open the first communication interface. Then, the first user may open a message that is the first type of message. Between the first user opening the first communication interface and the first user opening the message, one or more different actions may be performed (by the first user). A quantity of actions of the one or more different actions may be less than the threshold quantity of different actions.

In an example, the threshold quantity of different actions may be 3. A first exemplary set of activity of the first activity may comprise the one or more second actions being performed. Following the one or more second actions being performed, 2 actions, different than the one or more second actions and/or the one or more first actions, may be performed. Following the 2 actions being performed, the one or more first actions may be performed. Accordingly, because the threshold quantity of different actions is 3 and/or because the quantity of different actions corresponding to different actions performed between the one or more second actions and the one or more first actions is 2, the first exemplary set of activity may be determined to be a first exemplary pattern instance of the plurality of pattern instances corresponding to the first activity pattern.

In a different example, the threshold quantity of different actions may be 2. A second exemplary set of activity of the first activity may comprise the one or more second actions being performed. Following the one or more second actions being performed, 3 actions, different than the one or more second actions and/or the one or more first actions, may be performed. Following the 3 actions being performed, the one or more first actions may be performed. Accordingly, because the threshold quantity of different actions is 2 and/or because the quantity of different actions corresponding to different actions performed between the one or more second actions and the one or more first actions is 3, the first exemplary set of activity may be determined to be not be a pattern instance corresponding to the first activity pattern.

Alternatively and/or additionally, a set of activity may be determined to be a pattern instance corresponding to the first activity pattern if the set of activity comprises the one or more first actions being performed following the one or more second actions and/or a duration of time between the one or more second actions being performed and the one or more first actions being performed is less than a threshold duration of time (e.g., 30 seconds, 1 minute, 5 minutes, etc.).

In an example, the threshold duration of time may be 30 seconds. A third exemplary set of activity of the first activity may comprise the one or more second actions being performed. After 20 seconds, the one or more first actions may be performed (e.g., the one or more first actions may begin to be performed after 20 seconds after the one or more second actions are performed). Accordingly, because the threshold duration of time is 30 seconds and/or because the duration of time between the one or more second actions being performed and the one or more first actions being performed is 20 seconds (which is less than the threshold duration of time), the third exemplary set of activity may be determined to be a second exemplary pattern instance of the plurality of pattern instances corresponding to the first activity pattern.

In a different example, the threshold duration of time may be 20 seconds. A fourth exemplary set of activity of the first activity may comprise the one or more second actions being performed. After 25 seconds, the one or more first actions may be performed (e.g., the one or more first actions may begin to be performed after 25 seconds after the one or more second actions are performed). Accordingly, because the threshold duration of time is 20 seconds and/or because the duration of time between the one or more second actions being performed and the one or more first actions being performed is 25 seconds (which is greater than the threshold duration of time), the fourth exemplary set of activity may be determined to be not be a pattern instance corresponding to the first activity pattern.

Alternatively and/or additionally, a set of activity may be determined to be a pattern instance corresponding to the first activity pattern if the set of activity is performed at a time determined to meet the one or more first conditions.

At 406, the first activity pattern may be stored in a first user profile associated with the first user account. For example, the first user profile may comprise a plurality of activity patterns associated with the first user account. Alternatively and/or additionally, each activity pattern of the plurality of activity patterns may be associated with a set of conditions of a plurality of sets of conditions. In some examples, the plurality of activity patterns may be determined based upon the first activity, other activity different than the first activity and/or messages received and/or transmitted by the first user account.

In some examples, a first quantity of pattern instances of the plurality of pattern instances (associated with sets of activity corresponding to the first activity pattern) may be determined. In some examples, the first activity pattern may be stored in the first user profile responsive to determining that the first quantity of pattern instances of the plurality of pattern instances exceeds a threshold quantity of pattern instances (e.g., the first activity pattern may be stored in the first user profile responsive to determining that the first quantity of pattern instances exceeds 50 pattern instances, the first quantity of pattern instances exceeds 500 pattern instances, etc.).

Alternatively and/or additionally, a first pattern instance rate at which pattern instances corresponding to the first activity pattern occurs may be determined. For example, the first pattern instance rate may correspond to a quantity of pattern instances that occurs per unit of time (e.g., per minute, per hour, per day, per week, etc.). Alternatively and/or additionally, the first activity pattern may be stored in the first user profile responsive to determining that the first pattern instance rate exceeds a threshold pattern instance rate (e.g., the first activity pattern may be stored in the first user profile responsive to determining that the first pattern instance rate exceeds 5 pattern instances corresponding to the first activity pattern per day, the first pattern instance rate exceeds 5 pattern instances corresponding to the first activity pattern per week, etc.).

In some examples, a pattern precision associated with the first activity pattern may be determined. For example, the pattern precision may be determined based upon the first quantity of pattern instances and/or a total quantity of instances of the first set of conditions being met. The total quantity of instances of the first set of conditions being met may correspond to a quantity of instances that the one or more second actions are performed. In some examples, the pattern precision may be determined by combining the first quantity of pattern instances (corresponding to instances where the one or more first actions are performed when the first set of conditions are met) and the total quantity of instances (corresponding to instances where the first set of conditions are met).

In some examples, the pattern precision may be determined by dividing the first quantity of pattern instances by the total quantity of instances. The pattern precision having a low value may be indicative of a low probability of the one or more first actions being performed when the first set of conditions are met. For example, the pattern precision having a low value may be indicative of a low probability that, after detecting the one or more second actions being performed, the one or more first actions will be performed. Alternatively and/or additionally, the pattern precision having a low value may be indicative of a low probability that the one or more first actions will be performed at a time determined to meet the one or more first conditions. Alternatively and/or additionally, the pattern precision having a high value may be indicative of a high probability of the one or more first actions being performed when the first set of conditions are met. For example, the pattern precision having a high value may be indicative of a high probability that, after detecting the one or more second actions being performed, the one or more first actions will be performed. Alternatively and/or additionally, the pattern precision having a high value may be indicative of a high probability that the one or more first actions will be performed at a time determined to meet the one or more first conditions.

In some examples, the first activity pattern may be stored in the first user profile responsive to determining that the pattern precision exceeds a threshold pattern precision. Alternatively and/or additionally, responsive to a determination that the pattern precision is less than the threshold pattern precision, the first activity pattern may not be stored in the first user profile (and/or the first activity pattern may be discarded).

At 408, a determination may be made that the first set of conditions are met. It may be determined that the first set of conditions are met by determining that the one or more first conditions are met. Alternatively and/or additionally, it may be determined that the first set of conditions are met by detecting second activity, comprising the one or more second actions (being performed using the first communication interface). For example, the plurality of sets of conditions may be analyzed based upon the second activity to determine that the second activity (comprising the one or more second actions) is associated with the first set of conditions of the plurality of sets of conditions.

In the first example (where the first sequence of actions comprises the first communication interface being opened, followed by the exemplary message that is the first type of message being opened), it may be determined that the first set of conditions are met by detecting the first communication interface being opened. In some examples, an indication that the first communication interface is opened may be received. It may be determined that the first set of conditions are met based upon the indication that the first communication interface is opened. For example, a request to access the first user account and/or the first communication interface may be received from the first client device (and/or a different client device associated with the first user account). It may be determined that the first set of conditions are met based upon the request to access the first user account and/or the first communication interface.

In the second example (where the first sequence of actions comprises the first exemplary set of text being inputted into the message drafting interface, followed by the second exemplary set of text and/or the exemplary content item being inputted into the message drafting interface), it may be determined that the first set of conditions are met by detecting a third exemplary set of text, that is associated with the first exemplary topic associated with the first activity pattern, being inputted into the message drafting interface (e.g., detecting the third exemplary set of text being inputted into the subject line field, detecting the third exemplary set of text being inputted into the message body field, etc.). For example, the third exemplary set of text may be determined to be associated with the first exemplary topic by analyzing the third exemplary set of text and/or by comparing the third exemplary set of text with messages of the first set of messages associated with the first exemplary topic.

In the third example (where the first sequence of actions comprises the second type of message being opened, the selection of the exemplary reply selectable input and/or the message drafting interface being opened for drafting the exemplary reply message, followed by the attachment interface being opened and/or the one or more files being attached to the exemplary reply message), it may be determined that the first set of conditions are met by detecting an exemplary message that is the second type of message (e.g., a work-related message) being opened and/or a selection of an exemplary reply selectable input corresponding to drafting and/or transmitting an exemplary reply message as a response to the exemplary message. For example, it may be determined that the exemplary message is the second type of message (e.g., a work-related message) by analyzing content of the exemplary message.

In the fourth example (where the first sequence of actions comprises the first communication interface being opened, followed by the exemplary message that is the first type of message being opened, during the first time of day), it may be determined that the first set of conditions are met by detecting the first communication interface being opened during the first time of day (e.g., 8:00 AM-11:00 AM)).

In the fifth example (where the first sequence of actions comprises the exemplary occasion-related message (e.g., happy birthday message) being drafted and/or transmitted to an exemplary user account that is the first type of user account, during a time associated with an exemplary occasion (e.g., birthday) associated with the exemplary user account), it may be determined that the first set of conditions are met by determining that a current time matches an exemplary occasion (e.g., birthday) associated with an exemplary user account and/or that the exemplary user account is the first type of user account. For example, it may be determined that the first set of conditions are met by determining that the current time is within an exemplary threshold duration of time before the exemplary occasion (e.g., birthday), that the current time is during the exemplary occasion (e.g., birthday) and/or that the current time is within the exemplary threshold duration of time after the exemplary occasion (e.g., birthday).

Alternatively and/or additionally, it may be determined that the first exemplary user account is the first type of user account based upon a determination that an exemplary type of relationship between the first user and an exemplary user associated with the exemplary user account is a first type of relationship associated with the first type of user account (e.g., familial relationship). For example, it may be determined that the exemplary type of relationship is the first type of relationship based upon a social media profile associated with the first user account, a social media profile associated with the exemplary user account, content within messages associated with the first user account and/or the exemplary user account, etc.

Alternatively and/or additionally, it may be determined that the first exemplary user account is the first type of user account based upon a determination that an exemplary level of communication between the first user account and the exemplary user account exceeds a threshold level of communication associated with the first type of user account. For example, the exemplary level of communication may correspond to an amount of communication between the first user account and the exemplary user account. For example, the exemplary level of communication may be determined based upon a quantity of communications (e.g., messages, emails, phone calls, video calls, voice calls, etc.) between the first user account and the exemplary user account. Alternatively and/or additionally, the exemplary level of communication may be determined based upon a frequency of communications (e.g., a number of communications per day, a number of communications per week, etc.) between the first user account and the exemplary user account. Alternatively and/or additionally, the exemplary level of communication may be determined based upon lengths of communications (e.g., number of characters in emails and/or messages, lengths of time associated with phone calls, calls using the communication app and/or video calls, etc.) between the first user account and the exemplary user account.

At 410, responsive to determining that the first set of conditions are met, one or more first operations associated with the first activity pattern may be performed. For example, the one or more first operations may be associated with the one or more first actions of the first activity pattern.

In the first example (where the first sequence of actions comprises the first communication interface being opened, followed by the exemplary message that is the first type of message being opened), rather than displaying the list of messages (e.g., the inbox of the first user account), an exemplary message that is the first type of message may be displayed (automatically without a selection of the exemplary message from the list of messages) responsive to the first communication interface being opened.

For example, responsive to determining that the first set of conditions are met (e.g., responsive to receiving a request to open the first communication interface), the plurality of messages associated with the first user account (e.g., messages received and/or transmitted by the first user account) may be analyzed based upon the first type of message to identify an exemplary message that is the first type of message (e.g., a most recently received unread message of the plurality of messages associated with the first user account). For example, responsive to identifying the exemplary message that is the first type of message, the exemplary message may be displayed using the first communication interface (automatically).

In the second example (where the first sequence of actions comprises the first exemplary set of text being inputted into the message drafting interface, followed by the second exemplary set of text and/or the exemplary content item being inputted into the message drafting interface), responsive to detecting the third exemplary set of text associated with the first exemplary topic being inputted into the message drafting interface, content associated with the first exemplary topic may be generated.

The content may be generated based upon the first set of messages (comprising sets of text associated with the first exemplary topic). For example, first text, associated with the first exemplary topic, may be extracted from the first set of messages. A first message body (e.g., an email body) may be generated based upon the first text.

Alternatively and/or additionally, the content may be generated based upon one or more messages transmitted to a second user account. For example, the second user account may be an intended recipient of a message being drafted using the message drafting interface (e.g., an indication of the second user account may be entered into a recipient input field of the message drafting interface). For example, second text may be extracted from the one or more messages transmitted to the second user account. The first message body may be generated based upon the second text. For example, one or more characteristics of the one or more messages transmitted to the second user account by the first user account may be determined (e.g., a nickname used in the one or more messages for addressing a second user associated with the second user account, a level of formality of the one or more messages, etc.). For example, the first message body may be generated based upon the second text and/or the one or more characteristics.

Alternatively and/or additionally, content items (e.g., images, videos, animations, GIF animations, audio files, files, etc.) may be extracted from the first set of messages. For example, one or more content items may be selected from the content items for inclusion into the content. In some examples, the content, comprising the first message body and/or the one or more content items may be (automatically) entered into one or more input fields (e.g., a message body field) of the message drafting interface.

Alternatively and/or additionally, a first notification, associated with entering the content into the message drafting interface, may be displayed using the first communication interface. For example, the first notification may comprise a first selectable input corresponding to entering the content into the one or more input fields of the message drafting interface. For example, responsive to a selection of the first selectable input, the content may be entered into the one or more input fields. Alternatively and/or additionally, the first notification may comprise a second selectable input corresponding to (automatically) generating a message comprising the content and/or (automatically) transmitting the message to the second user account. For example, responsive to a selection of the second selectable input, the message may be generated (using the first message body) and/or transmitted to the second user account.

In the third example (where the first sequence of actions comprises the second type of message (e.g., a work related message) being opened, the selection of the exemplary reply selectable input and/or the message drafting interface being opened for drafting the exemplary reply message, followed by the attachment interface being opened and/or the one or more files being attached to the exemplary reply message), the attachment interface may be opened (automatically) responsive to a selection of the exemplary reply selectable input corresponding to drafting and/or transmitting an exemplary reply message as a response to the exemplary message.

For example, responsive to determining that the first set of conditions are met (and/or responsive to the selection of the exemplary reply selectable input), the attachment interface may be opened. Alternatively and/or additionally, responsive to determining that the first set of conditions are met and/or receiving a request to transmit the exemplary reply message as a response to the exemplary message, the exemplary reply message may be analyzed to determine whether the exemplary reply message comprises one or more attachments. Responsive to a determination that the exemplary reply message does not comprise one or more attachments, a second notification may be displayed using the first communication interface. For example, the second notification may be indicative of the exemplary reply message not comprising one or more attachments. The second notification may comprise a third selectable input corresponding to opening the attachment interface for selecting one or more files as attachments to the exemplary reply message. For example, responsive to a selection of the third selectable input, the attachment interface may be displayed.

In the fourth example (where the first sequence of actions comprises the first communication interface being opened, followed by the exemplary message that is the first type of message being opened, during the first time of day), rather than displaying the list of messages (e.g., the inbox of the first user account), an exemplary message that is the first type of message may be displayed (automatically without a selection of the exemplary message from the list of messages) responsive to the first communication interface being opened during the first time of day.

In the fifth example (where the first sequence of actions comprises the exemplary occasion-related message (e.g., happy birthday message) being drafted and/or transmitted to an exemplary user account that is the first type of user account, during a time associated with an exemplary occasion (e.g., birthday) associated with the exemplary user account), a third notification may be displayed using the first communication interface responsive to determining that a current time matches an occasion (e.g., birthday) of a third user account and/or that the third user account is the first type of user account. Alternatively and/or additionally, the third notification may be displayed responsive to the first communication interface being opened.

In some examples, the third notification may comprise a fourth selectable input corresponding to opening the message drafting interface for drafting a message corresponding to the occasion (e.g., birthday) of the third user account. For example, responsive to a selection of the fourth selectable input, the message drafting interface may be displayed using the first communication interface. Alternatively and/or additionally, an indication of the third user account (e.g., an email address associated with the third user account) may be (automatically) entered into a recipient input field of the message drafting interface.

Alternatively and/or additionally, the third notification may comprise a fifth selectable input corresponding to generating second content and/or entering the second content into the message drafting interface. For example, responsive to receiving a selection of the fifth selectable input, the second content may be generated based upon the second set of messages (e.g., the second content may be generated based upon text of the second set of messages, content items of the second set of messages, etc.). Alternatively and/or additionally, the second content may be generated based upon one or more second messages transmitted by the first user account to the third user account (e.g., the second content may be generated based upon one or more second characteristics of the one or more second messages). In some examples, the second content may be entered into the message drafting interface.

Alternatively and/or additionally, the third notification may comprise a sixth selectable input corresponding to automatically generating an occasion-related message (e.g., happy birthday message) comprising the second content and/or automatically transmitting the occasion-related message (e.g., happy birthday message) to the third user account. For example, responsive to a selection of the sixth selectable input, the occasion-related message (e.g., happy birthday message) may be generated and/or transmitted to the third user account (e.g., the happy birthday message may comprise the second content).

Alternatively and/or additionally, the third notification may not be displayed. For example, rather than displaying the third notification, the occasion-related message (e.g., happy birthday message) (comprising the second content) may automatically be generated and/or transmitted to the third user account (without notifying the first user).

Alternatively and/or additionally, it may be determined that merely a portion of the first set of conditions are met. For example, it may be determined that a current time matches an occasion (e.g., birthday) associated with a fourth user account and/or that the fourth user account is not the first type of user account (e.g., a level of communication between the first user account and the fourth user account may be less than the threshold level of communication and/or a type of relationship between the first user and a fourth user associated with the fourth user account may be a type of relationship different than the first type of relationship).

In some examples, responsive to detecting an indication of the fourth user account (e.g., an email address associated with the fourth user account, a name associated with the fourth user account, etc.) being entered into an input field (e.g., a recipient field) of the message drafting interface, a fourth notification may be displayed. For example, the fourth notification may comprise a seventh selectable input corresponding to adding a set of text (e.g., one or more sentences, one or more words, etc.) associated with the occasion (e.g., birthday) to an input field (e.g., a message body field) of the message drafting interface (e.g., the set of text may be a summarized and/or shorter version of the second content used to generate the happy birthday message). In some examples, responsive to a selection of the seventh selectable input, the set of text may be added to the input field of the message drafting interface. Alternatively and/or additionally, rather than displaying the fourth notification, the set of text may be added to the input field of the message drafting interface automatically (without a selection of the seventh selectable input and/or without notifying the first user).

Figure 4B:
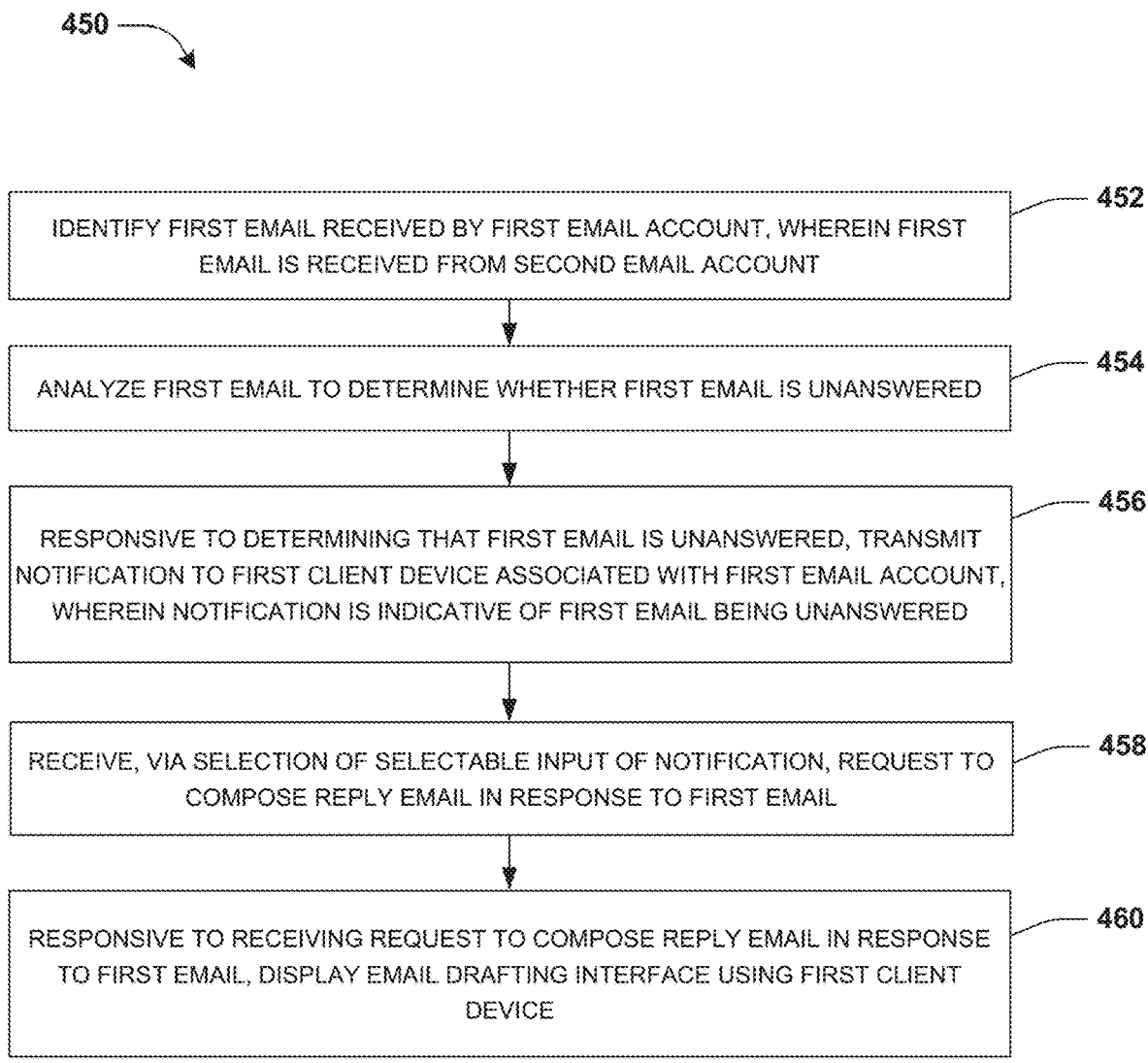
FIG. 4B is a flow chart illustrating an example method for determining unanswered emails and/or displaying notifications indicative of the unanswered emails.

An embodiment of determining unanswered emails and/or displaying notifications indicative of the unanswered emails is illustrated by an example method 450 of FIG. 4B. A first user, such as user Jack, and/or a first client device associated with the first user may access and/or interact with a communication system (and/or an email system, messaging system, etc.) for sending and/or receiving emails and/or performing communications via messaging, voice calls, video calls, etc. For example, a first email account (and/or a different type of user account, such as a messaging user account, a social media user account, etc.) of the first user with the communication system may be accessed and/or interacted with via a first email interface (and/or a different type of communication interface), such as an email client, a web email interface accessed via a browser, an email application, etc. on the first client device. In some examples, the communication system (and/or the first email interface) may be associated with an email service provider.

At 452, a first email received by the first email account may be identified. For example, the first email may be received from a second email account. The first email may comprise first email text (e.g., a subject line, an email body, etc.) and/or one or more content items (e.g., one or more images, one or more videos, one or more animations, one or more GIF animations, etc.). In some examples, responsive to the first email being received by the first email account, the first email may be added to a list of emails associated with the first email account (e.g., an inbox of the first email account). Alternatively and/or additionally, the first email may be accessed using the first email interface.

At 454, the first email may be analyzed to determine whether the first email is unanswered (e.g., whether the first email is unresolved, whether the first email is open, etc.). In some examples, the first email may be analyzed to determine whether the first email is unanswered responsive to a determination that a first duration of time since the first email was received (by the first email account) exceeds a first threshold duration of time. Alternatively and/or additionally, the first email may periodically (e.g., once per hour, once per day, etc.) be analyzed to determine whether the first email is unanswered.

For example, the first email may be analyzed to determine whether the first email is unanswered by analyzing the first email to determine whether the first email comprises one or more questions. For example, it may be determined that the first email comprises one or more first questions. It may be determined that the first email comprises the one or more first questions by using one or more text analysis techniques to identify the one or more first questions. Alternatively and/or additionally, it may be determined that the first email comprises the one or more first questions by using one or more vector analysis techniques (e.g., analyzing vectors associated with the first email).

Responsive to determining that the first email comprises the one or more first questions, emails associated with the first email account may be analyzed to determine whether an email comprising one or more answers to the one or more first questions has been transmitted to the second email account (e.g., the one or more answers may correspond to responses directed towards the one or more first questions, the one or more answers may correspond to information related to the one or more first questions, etc.).

For example, a first set of emails transmitted by the first email account to the second email account may be identified. The first set of emails may be analyzed (based upon the one or more first questions) to determine whether the first set of emails comprise one or more emails that comprise one or more answers to the one or more first questions. For example, one or more first emails, comprising one or more first answers to the one or more first questions, may be identified. In some examples, the one or more first emails and/or the one or more first answers may be identified using one or more text analysis techniques and/or one or more machine learning techniques. In an example, the one or more first questions may comprise a first exemplary question "Do you know when you'll be able to work on this project with me?" and/or the one or more first answers may comprise a first exemplary answer "I'll be free next week. Call me on Monday".

Responsive to identifying the one or more first emails and/or the one or more first answers, it may be determined that the first email is not unanswered (e.g., it may be determined that the first email is answered, it may be determined that the first email is resolved, it may be determined that the first email is closed, etc.). Alternatively and/or additionally, responsive to determining that the first set of emails (transmitted to the second email account by the first email account) does not comprise one or more emails comprising one or more answers to the one or more first questions, it may be determined that the first email is unanswered. For example, responsive to determining that an email comprising an answer to the one or more first questions was not transmitted to the second email account by the first email account, it may be determined that the first email is unanswered.

Alternatively and/or additionally, the first email may be analyzed to determine whether the first email is unanswered by analyzing the first email to determine whether the first email comprises one or more requests (e.g., one or more requests for information, a request for a report, a request for a file, etc.). For example, it may be determined that the first email comprises one or more first requests. It may be determined that the first email comprises the one or more first requests by using one or more text analysis techniques to identify the one or more first requests. Alternatively and/or additionally, it may be determined that the first email comprises the one or more first requests by using one or more vector analysis techniques (e.g., analyzing vectors associated with the first email).

Responsive to determining that the first email comprises the one or more first requests, emails associated with the first email account may be analyzed to determine whether an email comprising information associated with the one or more first requests has been transmitted to the second email account (e.g., the information may be requested information associated with the one or more first requests, responses related to the one or more first requests, etc.).

For example, the first set of emails may be analyzed (based upon the one or more first requests) to determine whether the first set of emails comprise one or more emails that comprise information associated with the one or more first requests. For example, one or more second emails, comprising first information associated with the one or more first requests, may be identified. In some examples, the one or more second emails and/or the first information may be identified using one or more text analysis techniques and/or one or more machine learning techniques. In an example, the one or more first requests may comprise a first exemplary request "Please send me times you'll be available next week" and/or the first information may comprise a set of text "I'll be free Monday 6 PM-10 PM and Tuesday 4 PM til late". In a different example, the one or more first requests may comprise a second exemplary request "Send me a report by the end of the week" and/or the first information may comprise a file attached to an email of the one or more second emails entitled "Project Report".

Responsive to identifying the one or more second emails and/or the first information associated with the one or more first requests, it may be determined that the first email is not unanswered. Alternatively and/or additionally, responsive to determining that the first set of emails (transmitted to the second email account by the first email account) does not comprise one or more emails comprising information associated with the one or more first requests, it may be determined that the first email is unanswered. For example, responsive to determining that an email comprising information associated with the one or more first requests was not transmitted to the second email account by the first email account, it may be determined that the first email is unanswered.

Alternatively and/or additionally, a second set of reply emails transmitted by the first email account to the second email account may be identified. For example, the second set of reply emails may be transmitted in response to the first email (e.g., the second set of reply emails and/or the first email may be a part of a single email conversation).

In some examples, rather than analyzing the first set of emails, merely the second set of reply emails may be analyzed (based upon the one or more first questions and/or the one or more first requests) to determine whether the first email is unanswered. For example, responsive to identifying one or more reply emails, of the second set of reply emails, that comprise one or more answers to the one or more first questions, it may be determined that the first email is not unanswered. Alternatively and/or additionally, responsive to determining that the second set of reply emails does not comprise one or more reply emails comprising one or more answers to the one or more first questions, it may be determined that the first email is unanswered.

Alternatively and/or additionally, responsive to identifying one or more reply emails, of the second set of reply emails, that comprise information associated with the one or more first requests, it may be determined that the first email is not unanswered. Alternatively and/or additionally, responsive to determining that the second set of reply emails does not comprise one or more reply emails comprising information associated with the one or more first requests, it may be determined that the first email is unanswered.

In some examples, rather than analyzing the first set of emails and/or the second set of reply emails, it may be determined that the first email is not unanswered by (merely) identifying a reply email transmitted by the first email account to the second email account in response to the first email (regardless of whether the reply email comprises information associated with the one or more first requests and/or one or more answers to the one or more first questions). Alternatively and/or additionally, it may be determined that the first email is unanswered by determining that a reply email was not transmitted by the first email account to the second email account in response to the first email.

At 456, responsive to determining that the first email is unanswered, a first notification may be transmitted to the first client device (associated with the first email account). The first notification may be indicative of the first email being unanswered. Alternatively and/or additionally, responsive to determining that the first email is unanswered, an indication of the first email may be stored in a list of unanswered emails. For example, the list of unanswered emails may comprise indications of a plurality of emails that are unanswered.

In some examples, the first notification may be transmitted to the first client device responsive to a determination that a second duration of time since the first email was received (by the first email account) exceeds a second threshold duration of time. In an example, 1 week after the first email account received the first email from the second email account, the first notification may be transmitted (automatically).

Alternatively and/or additionally, the first notification may be transmitted to the first client device responsive to a determination that a level of communication between the first email account and the second email account exceeds a threshold level of communication. For example, the level of communication may correspond to an amount of communication between the first email account and the second email account (and/or between a third account associated with the user of the first email account and a fourth account associated with the user of the second email account, wherein the third account and/or the fourth account may be email accounts or other types of accounts, such as messaging accounts, phone numbers, etc.). For example, the level of communication may be determined based upon a quantity of communications (e.g., messages, emails, phone calls, video calls, voice calls, etc.) between the first email account and the second email account.

Alternatively and/or additionally, the level of communication may be determined based upon a frequency of communications (e.g., a number of communications per day, a number of communications per week, etc.) between the first email account and the second email account (and/or between the third account associated with the user of the first email account and the fourth account associated with the user of the second email account). Alternatively and/or additionally, the level of communication may be determined based upon lengths of communications (e.g., number of characters in emails and/or messages, lengths of time associated with phone calls, calls using the communication app and/or video calls, etc.) between the first email account and the second email account.

In some examples, the first notification may be transmitted responsive to detecting an email address of the second email account being inputted into one or more input fields of the first email interface (using the first client device). For example, an email drafting interface of the first email interface may be opened (responsive to a selection of a compose selectable input of the first email interface corresponding to drafting and/or transmitting an email). The email drafting interface may be displayed using the first email interface.

The email drafting interface may comprise one or more email header fields. For example, the email drafting interface may comprise a first email header field "To:", a second email header field "CC:" and/or a third email header field "BCC:". The first email header field, the second email header field and/or the third email header field may correspond to recipients of the email being drafted using the email drafting interface.

In some examples, it may be detected that the email address of the second email account is inputted into one or more of the first email header field, the second email header field and/or the third email header field. Responsive to detecting the email address of the second email account being inputted into the one or more email header fields, the first notification may be transmitted to the first client device.

Alternatively and/or additionally, responsive to detecting the email address of the second email account being inputted into the one or more email header fields, emails received by the first email account from the second email account may be analyzed to determine whether one or more emails, received by the first email account from the second email account, are unanswered. Alternatively and/or additionally, the list of unanswered emails may be analyzed to determine whether one or more emails, received by the first email account from the second email account, are unanswered. For example, it may be determined that the first email is unanswered (and/or the first notification may be transmitted to the first client device).

In some examples, the first notification may be displayed using the first email interface. For example, the first notification may be opened (automatically) by the first email interface and/or the first client device. The first notification may be overlaid onto at least a portion of the email drafting interface. In an example, the first notification may comprise "samg@companyemail.com already sent you an email which contains a question which you have not responded to. Would you like to respond to that email rather than sending a new email?".

In some examples, the first notification may comprise a first selectable input corresponding to composing (e.g., drafting and/or transmitting) a first reply email in response to the first email. Alternatively and/or additionally, the first notification may comprise a second selectable input corresponding to displaying the first email. For example, responsive to receiving a selection of the second selectable input, the first email may be displayed using the first email interface.

Alternatively and/or additionally, in an example where the first email is answered, emails received by the first email account from the second email account may be analyzed to identify a received email (and/or an email conversation) received from the second email account (e.g., the received email may correspond to a most recently received email received from the second user account). For example, responsive to identifying the received email, a second notification may be displayed using the first client device. The second notification may comprise a representation of the received email (e.g., the second notification may comprise a body of the received email) and/or an email conversation associated with the received email. Alternatively and/or additionally, the second notification may comprise an indication of a time that the received email was received by the first email account. Alternatively and/or additionally, the second notification may comprise an indication of a subject line associated with the received email. Alternatively and/or additionally, the second notification may comprise a selectable input corresponding to displaying the received email.

At 458, a request to compose the first reply email in response to the first email may be received via a selection of the first selectable input of the first notification. At 460, responsive to receiving the request to compose the first reply email in response to the first email, the email drafting interface may be displayed. One or more of the first email header field, the second email header field and/or the third email header field of the email drafting interface may comprise the email address of the second email account.

Alternatively and/or additionally, a fourth email header field of the email drafting interface, corresponding to an email subject of the first reply email, may comprise a first subject line indicative of the first reply email being a response to the first email. For example, if a second subject line of the first email is "Report Needed", then the first subject line may be "Re: Report Needed". Alternatively and/or additionally, an indication of an email body of the first email may be (automatically) entered into an email body field of the email drafting interface.

Alternatively and/or additionally, the first notification may comprise a third selectable input corresponding to composing a second email for transmission to the second email account (e.g., the second email may correspond to an email that is not transmitted as a response to the first email). For example, a request to compose the second email may be received via a selection of the third selectable input of the first notification. Responsive to receiving the request to compose the second email, the email drafting interface may be displayed. One or more of the first email header field, the second email header field and/or the third email header field of the email drafting interface may comprise the email address of the second email account. Alternatively and/or additionally, the fourth email header field of the email drafting interface may not comprise the first subject line. Alternatively and/or additionally, the email body of the first email may not be entered into the email body field of the email drafting interface.

In some examples, one or more operations may be performed (automatically) using the email drafting interface based upon a user profile associated with the first email account (as described in method 400). For example, the user profile may comprise a plurality of activity patterns associated with the first email account. Responsive to detecting activity corresponding to an activity pattern of the plurality of activity patterns, one or more operations associated with the activity pattern may be performed. For example, responsive to a first set of text being entered into the email body field of the email drafting interface, the first set of text may be analyzed to determine identify an activity pattern of the plurality of activity patterns associated with the first set of text being inputted.

For example, it may be determined that the first set of text (e.g., "Happy New Year's") is associated with a first activity pattern of the plurality of activity patterns (e.g., a topic of the first set of text, one or more words and/or characters of the first set of text, etc. may be associated with the first activity pattern). In some examples, responsive to the first set of text being entered into the email body field, a first set of conditions associated with the first activity pattern may be met. Alternatively and/or additionally, responsive to the first set of conditions being met, one or more operations associated with the first activity pattern may be performed. For example, a second set of text (e.g., "Melissa and I wish you and Greg the best for the New Year") may be generated based upon the first activity pattern and/or the first set of text. The second set of text may be entered into the email body field (automatically). Alternatively and/or additionally, a third notification may be displayed. The third notification may comprise a fourth selectable input corresponding to entering the second set of text into the email body field (and/or one or more input fields of the email drafting interface). For example, responsive to a selection of the fourth selectable input, the second set of text may be entered into the email body field.

FIGS. 5A-5F illustrate examples of a system 501 for determining activity patterns based upon user activity and/or performing operations based upon the activity patterns. A user, such as user Thomas, (e.g., and/or a first client device 500 associated with the user) may access and/or interact with a first email interface for sending and/or receiving emails, performing communications via messaging, voice calls, video calls, etc. In some examples, the first client device 500 may comprise a microphone 504, a speaker 506 and/or a button 502 (e.g., a switch).

In some examples, a first email account, associated with the user, may be accessed using the first email interface. First activity performed using the first email interface on the first client device 500 may be detected. For example, the first activity may comprise selectable inputs of the first email interface being selected (e.g., clicked, pressed, etc.) using the first client device 500. For example, the selectable inputs may correspond to one or more of one or more messages of a plurality of emails associated with the first email account, one or more settings associated with the first email account, one or more actions (e.g., transmitting a composed email, deleting an email, replying to an email, forwarding an email, opening an email, opening the first email interface, etc.), etc.

Figure 5A:
FIG. 5A is a component block diagram illustrating an example system for determining activity patterns based upon user activity and/or performing operations based upon the activity patterns, where a first client device is used to open a first email interface.

FIG. 5A illustrates the first client device 500 being used to open the first email interface. For example, the first client device 500 may display a list of application selectable inputs (e.g., the list of application selectable inputs may be displayed within an exemplary home-screen of the first client device 500). For example, the list of application selectable inputs may comprise a first selectable input 508 corresponding to the first email interface. For example, responsive to a selection of the first selectable input 508, a request to access the first email interface may be received and/or the first email interface may be opened using the first client device 500.

Figure 5B:
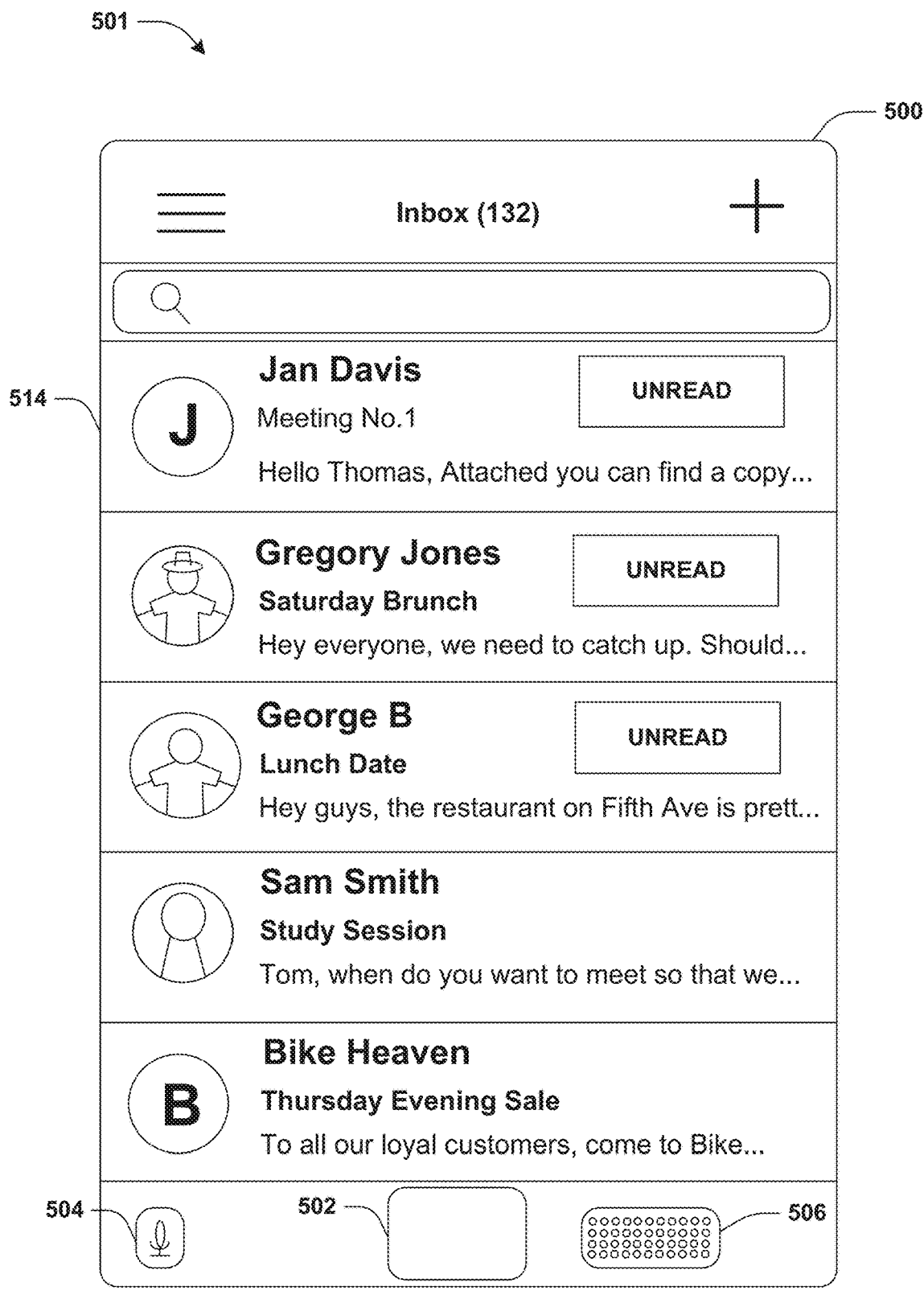
FIG. 5B is a component block diagram illustrating an example system for determining activity patterns based upon user activity and/or performing operations based upon the activity patterns, where a graphical user interface of a first client device is controlled to display a first email interface.

FIG. 5B illustrates a graphical user interface of the first client device 500 being controlled to display the first email interface. For example, the graphical user interface of the first client device 500 may be controlled to display the first email interface responsive to the selection of the first selectable input 508. In some examples, the first email interface may comprise a list of emails comprising a plurality of emails received by the first email account. A portion of the plurality of emails may be unread and/or recently received emails.

For example, the list of emails may comprise a first email 514 that is associated with a first type of email. For example, the first type of email may correspond to a most recently received unread email of the plurality of emails (e.g., a newest unread email). In some examples, a selection of the first email 514 may be received and/or the first email 514 may be opened (and/or displayed).

In some examples, the first email interface being opened using the first client device 500 followed by the first email 514 being opened may correspond to a first pattern instance associated with a first activity pattern 524 (illustrated in FIG. 5C) determined based upon the first activity. For example, the first activity may comprise a plurality of sets of activity, corresponding to a plurality pattern instances, where the first email interface is opened using the first client device 500 followed by an email that is the first type of email being opened. For example, the first activity pattern 524 may be determined based upon the plurality of pattern instances.

Figure 5C:
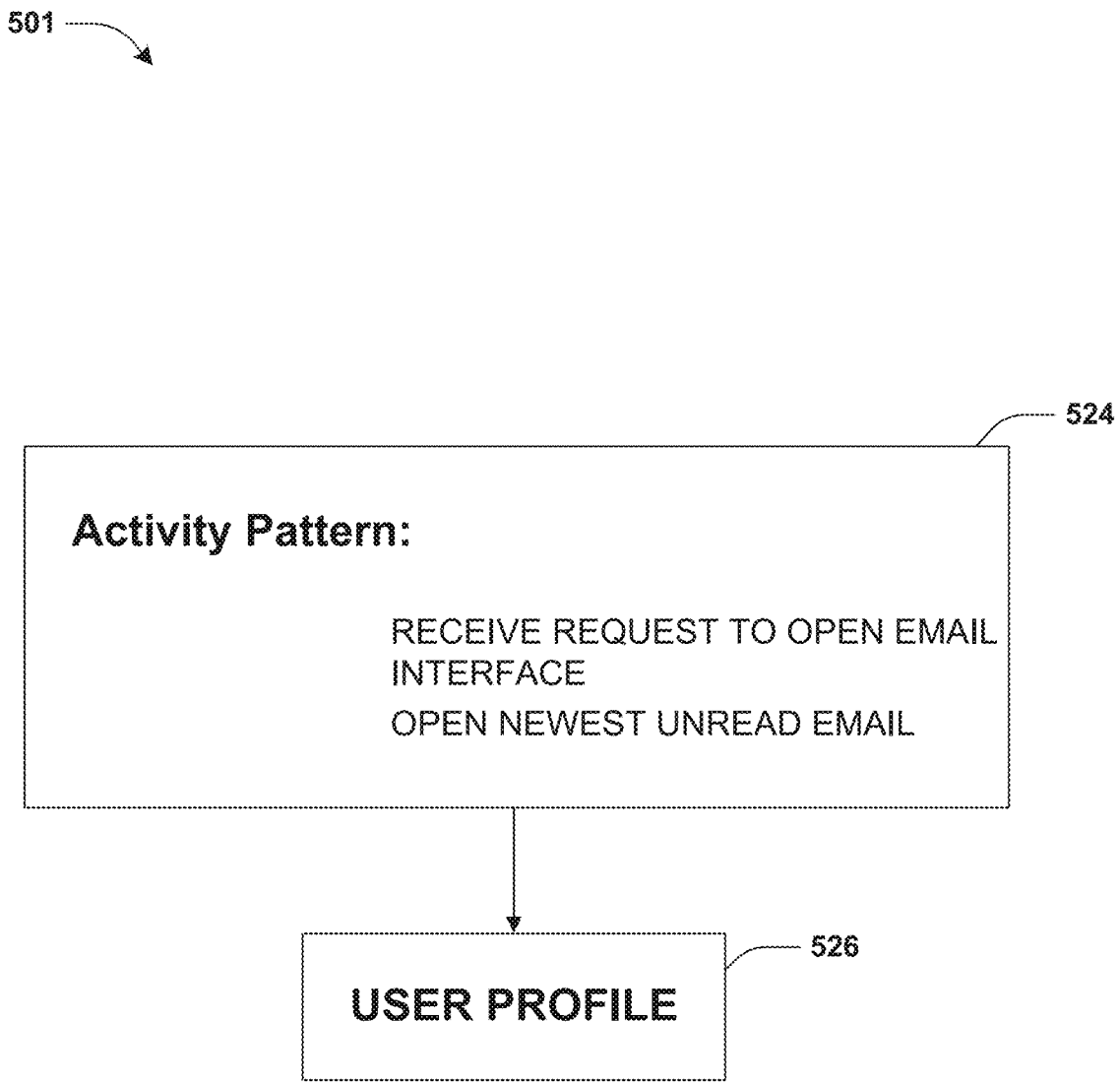
FIG. 5C is a component block diagram illustrating an example system for determining activity patterns based upon user activity and/or performing operations based upon the activity patterns, where a first activity pattern is stored in a user profile associated with a first email account.

FIG. 5C illustrates the first activity pattern 524 being stored in a user profile 526 associated with the first email account. For example, the first activity pattern 524 may be stored in the user profile 526 responsive to determining the first activity pattern. In some examples, the first activity pattern 524 may be indicative of a first set of conditions (e.g., receiving a request to open the first email interface) and/or one or more actions (e.g., open an email that is the first type of email).

Figure 5D:
FIG. 5D is a component block diagram illustrating an example system for determining activity patterns based upon user activity and/or performing operations based upon the activity patterns, where a first client device is used to open a first email interface.
Figure 5E:
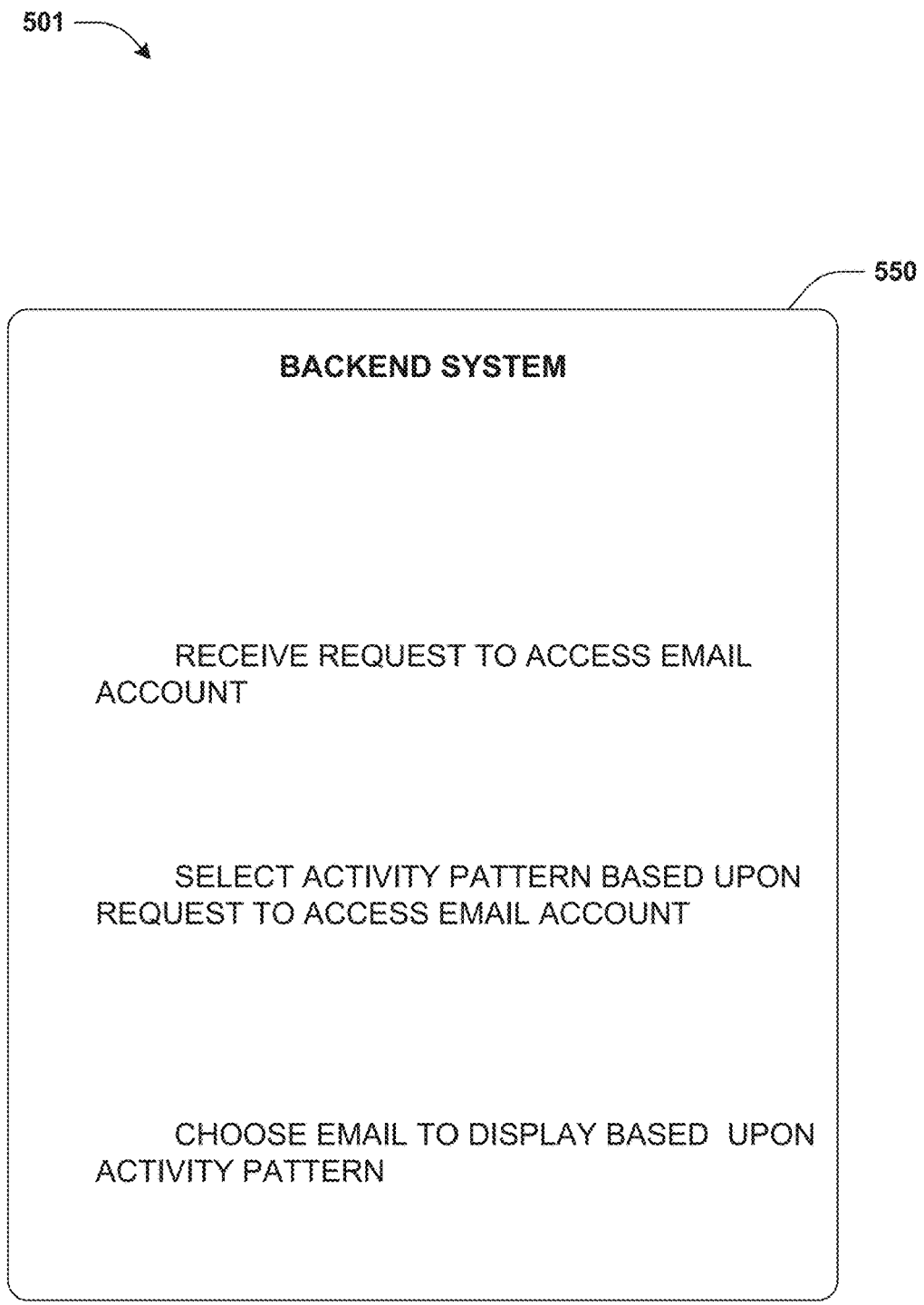
FIG. 5E is a component block diagram illustrating an example system for determining activity patterns based upon user activity and/or performing operations based upon the activity patterns, where a backend system performs one or more operations associated with a first activity pattern.

FIG. 5D illustrates the first client device 500 being used to open the first email interface. For example, responsive to a selection of the first selectable input 508, a request to access the first email interface may be received. FIG. 5E illustrates a backend system 550 performing one or more operations associated with the first activity pattern 524. For example, responsive to receiving the request to access the first email interface, the user profile 526 may be analyzed to select the first activity pattern 524 from a plurality of activity patterns comprised within the user profile 526. For example, the first activity pattern 524 may be selected based upon the request to access the first email interface.

Figure 5F:
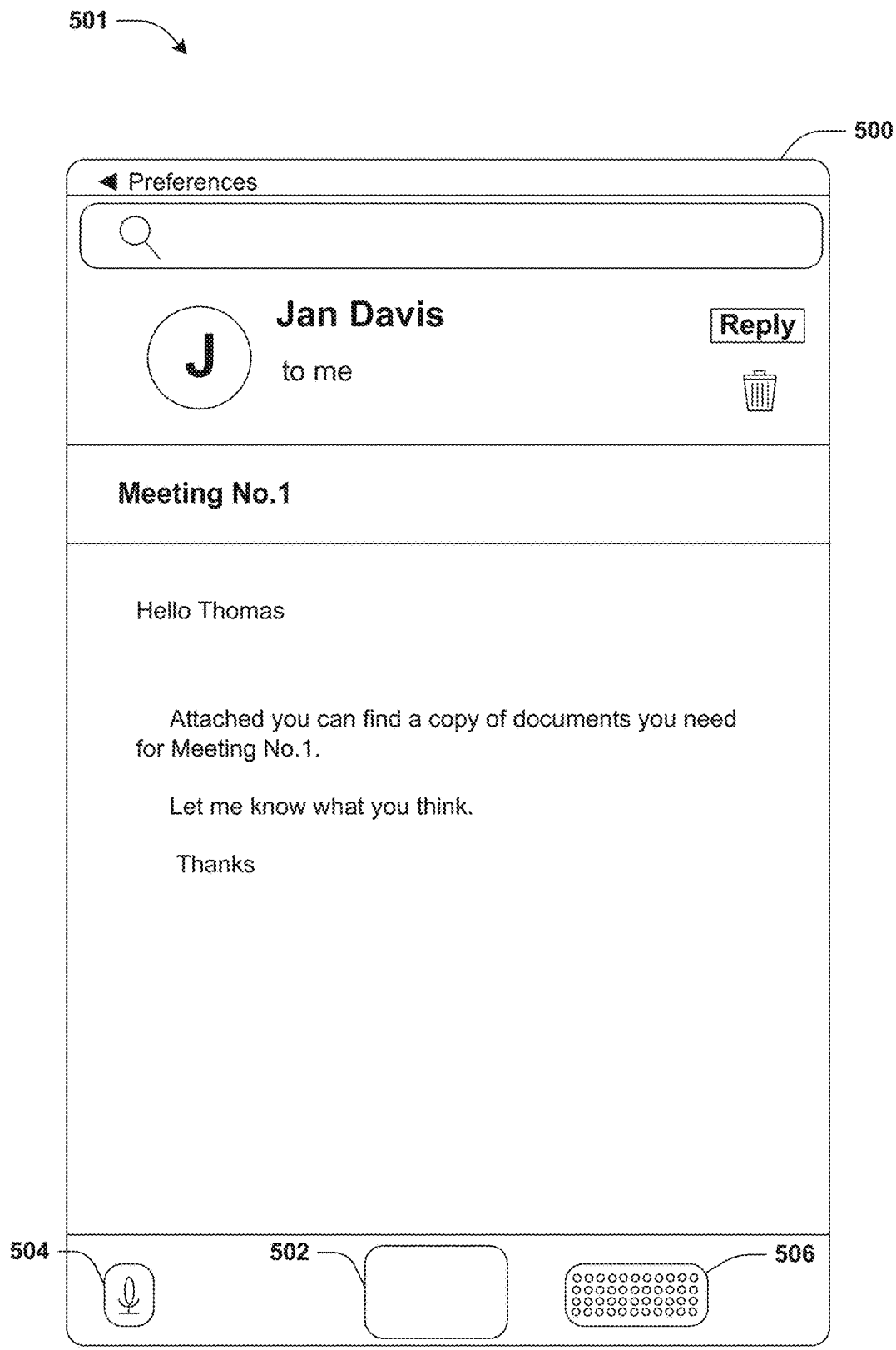
FIG. 5F is a component block diagram illustrating an example system for determining activity patterns based upon user activity and/or performing operations based upon the activity patterns, where a graphical user interface of a first client device is controlled to display a second email.

Alternatively and/or additionally, a second email associated with the first email account may be selected for being displayed based upon a determination that the second email is the first type of email (e.g., the second email may be a most recently received unread email associated with the first email account). FIG. 5F illustrates the graphical user interface of the first client device 500 being controlled to display the second email. For example, the second email may be displayed automatically responsive to the first email interface being opened (e.g., the user may not be required to select the second email).

Figure 6A:
FIG. 6A is a component block diagram illustrating an example system for determining activity patterns based upon user activity and/or performing operations based upon the activity patterns, where a first client device is used to open a first email interface.
Figure 6B:
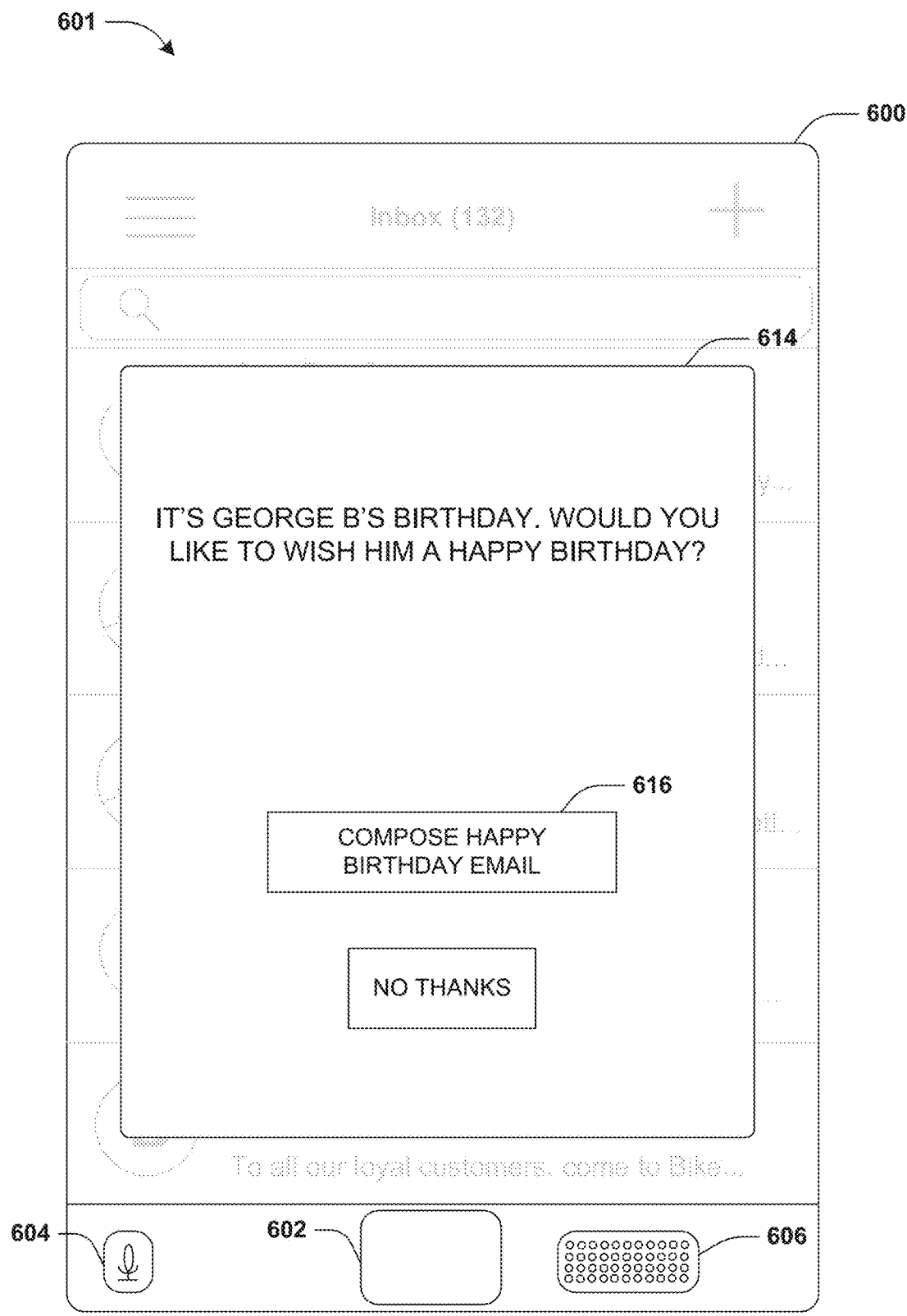
FIG. 6B is a component block diagram illustrating an example system for determining activity patterns based upon user activity and/or performing operations based upon the activity patterns, where a graphical user interface of a first client device is controlled to display a first notification.
Figure 6C:
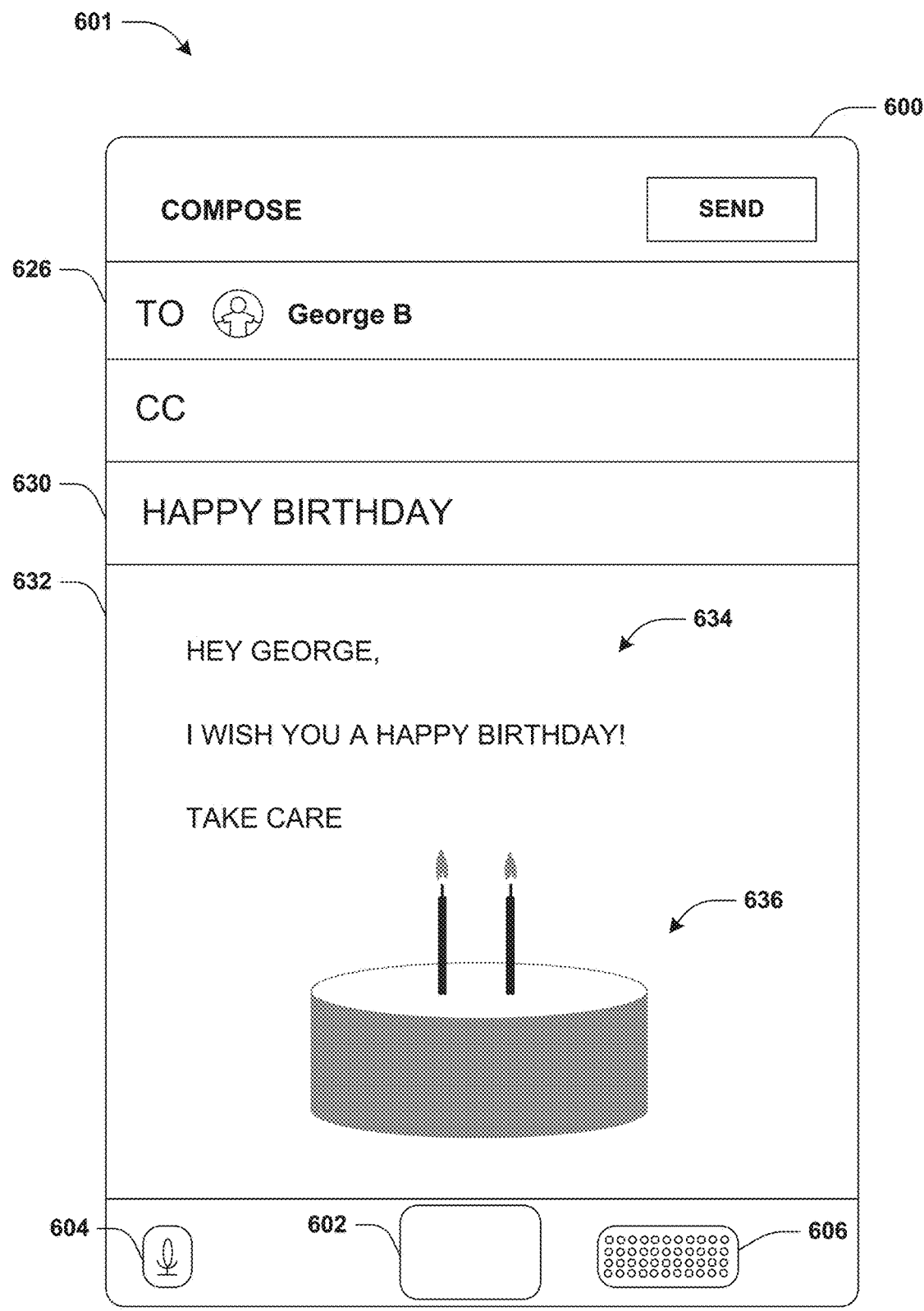
FIG. 6C is a component block diagram illustrating an example system for determining activity patterns based upon user activity and/or performing operations based upon the activity patterns, where a graphical user interface of a first client device is controlled to display an email drafting interface.

FIGS. 6A-6C illustrate examples of a system 601 for determining activity patterns based upon user activity and/or performing operations based upon the activity patterns. A user, such as user Tiffany, (e.g., and/or a first client device 600 associated with the user) may access and/or interact with a first email interface for sending and/or receiving emails, performing communications via messaging, voice calls, video calls, etc. In some examples, the first client device 600 may comprise a microphone 604, a speaker 606 and/or a button 602 (e.g., a switch).

In some examples, a first email account, associated with the user, may be accessed using the first email interface. First activity performed using the first email interface on the first client device 600 may be detected. For example, the first activity may comprise emails being transmitted to one or more email accounts. For example, a first activity pattern may be determined based upon the first activity.

The first activity may be associated with a first set of conditions and/or one or more actions. For example, the one or more actions may comprise drafting a happy birthday email and/or transmitting the happy birthday email to an exemplary email account. Alternatively and/or additionally, the first set of conditions may be associated with an occasion (e.g., a birthday) associated with an email account that is a first type of email account. For example, it may be determined that the first set of conditions are met responsive to a determination that a current time matches a birthday associated with an email account that is the first type of email account.

FIG. 6A illustrates the first client device 600 being used to open the first email interface. For example, the first client device 600 may display a list of application selectable inputs (e.g., the list of application selectable inputs may be displayed within an exemplary home-screen). For example, the list of application selectable inputs may comprise a first selectable input 608 corresponding to the first email interface. For example, responsive to a selection of the first selectable input 608, a request to access (and/or open) the first email interface may be received and/or the first email interface may be opened using the first client device 600.

In some examples, the request to access the first email interface may be received during a first birthday associated with a second email account. Alternatively and/or additionally, it may be determined that the second email account is the first type of email account based upon a type of relationship between the user and a second user associated with the second email account is a first type of relationship (e.g., social relationship) associated with the first type of user account. Alternatively and/or additionally, it may be determined that the first email account is the first type of email account based upon a determination that a level of communication between the first email account and the second email account exceeds a threshold level of communication associated with the first type of email account.

In some examples, it may be determined that the first set of conditions associated with the first activity pattern are met responsive to a determination that a current time matches the first birthday associated with the second email account. Alternatively and/or additionally, it may be determined that the first set of conditions associated with the first activity pattern are met responsive to a determination that the first email account is the first type of email account. In some examples, responsive to determining the first set of conditions associated with the first activity pattern are met, a first notification 614 may be transmitted to the first client device 600.

FIG. 6B illustrates a graphical user interface of the first client device 600 being controlled to display the first notification 614. For example, the first notification 614 may be displayed responsive to the first email interface being opened (and/or responsive to determining the first set of conditions associated with the first activity pattern are met). In some examples, the first notification 614 may comprise a second selectable input 616 corresponding to opening an email drafting interface for drafting and/or transmitting a first email (e.g., a happy birthday email) associated with the second email account.

In some examples, responsive to a selection of the first selectable input 616, content may be generated for inclusion in the first email. For example, a first set of emails associated with the first activity pattern (e.g., happy birthday emails) may be identified and/or first text may be extracted from the first set of emails. A first set of text 634 (illustrated in FIG. 6C) may (automatically, for example) be generated based upon the first set of emails. Alternatively and/or additionally, content items may be extracted from the first set of emails.

For example, a first content item 636 (illustrated in FIG. 6C) may be selected from the content items for inclusion in the content.

FIG. 6C illustrates the graphical user interface of the first client device 600 being controlled to display the email drafting interface. For example, an email address associated with the second email account may (automatically) be entered into a first email header field 626 corresponding to recipients of the first email. Alternatively and/or additionally, a set of text may (automatically) be entered into a second email header field 630 corresponding to a subject line of the first email. Alternatively and/or additionally, the content (comprising the first set of text 634 and/or the first content item 636) may be entered into an email body field 632.

FIGS. 7A-7D illustrate examples of a system 701 for determining unanswered emails and/or displaying notifications indicative of the unanswered emails. A user, such as user Thomas, (e.g., and/or a first client device 700 associated with the user) may access and/or interact with a first email interface for sending and/or receiving emails, performing communications via messaging, voice calls, video calls, etc. In some examples, the first client device 700 may comprise a microphone 704, a speaker 706 and/or a button 702 (e.g., a switch).

Figure 7A:
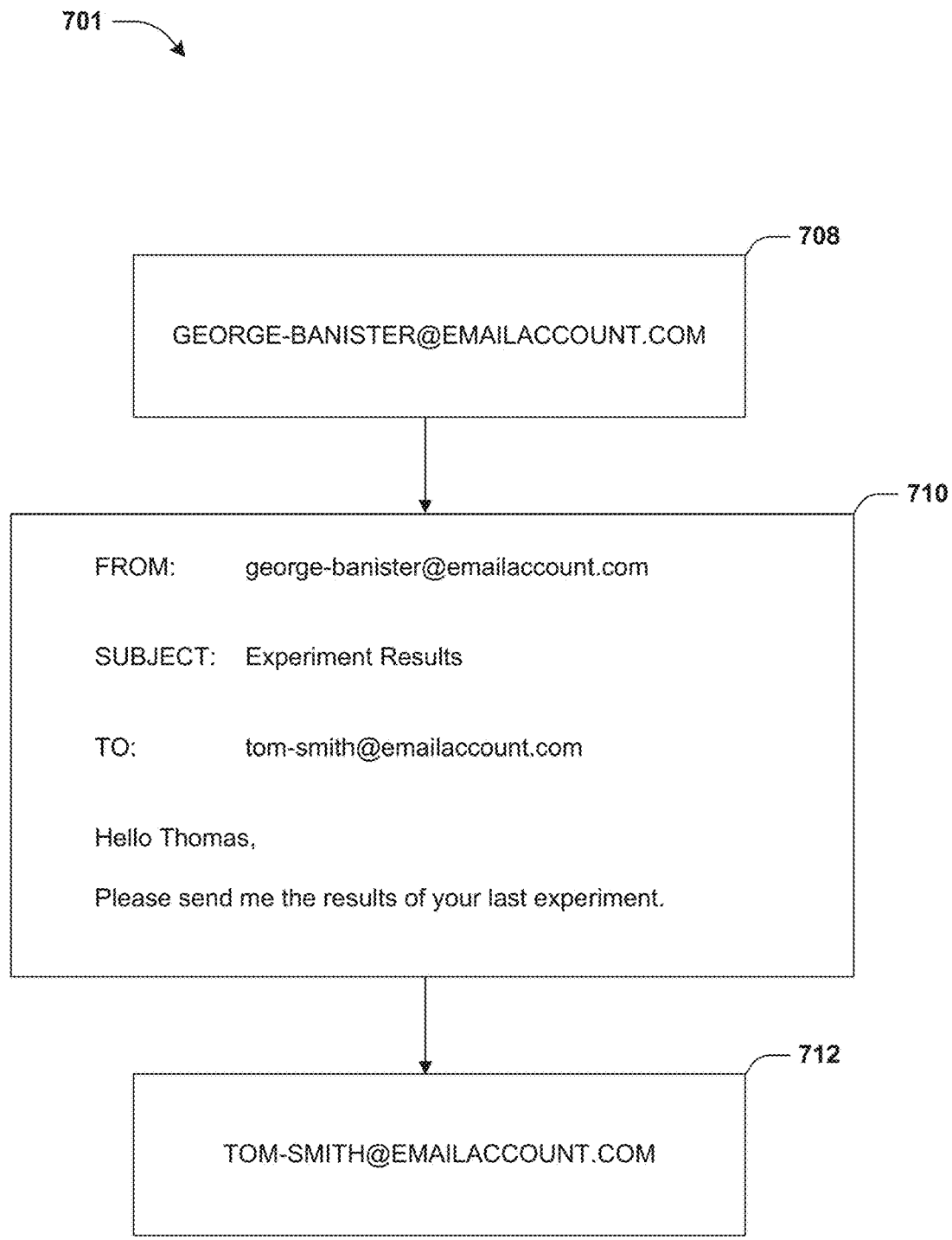
FIG. 7A is a component block diagram illustrating an example system for determining unanswered emails and/or displaying notifications indicative of the unanswered emails, where a first email is received by a first email account associated with a user.

FIG. 7A illustrates a first email 710 being received by a first email account 712 associated with the user. For example, the first email 710 may be transmitted by a second email account 708. In some examples, the first email 710 may comprise a first subject line "Experiment Results" and/or a first email body "Hello Thomas, Please send me the results of your last experiment.".

In some examples, the first email 710 may be analyzed to determine whether the first email is unanswered (e.g., whether the first email is unresolved, whether the first email is open, etc.). In some examples, the first email 710 may be analyzed to determine whether the first email 710 is unanswered responsive to a determination that a first duration of time since the first email 710 was received (by the first email account) exceeds a first threshold duration of time. Alternatively and/or additionally, the first email 710 may periodically (e.g., once per hour, once per day, etc.) be analyzed to determine whether the first email 710 is unanswered.

In some examples, the first email 710 may be analyzed to determine whether the first email 710 is unanswered by analyzing the first email 710 to determine whether the first email 710 comprises one or more requests (e.g., one or more requests for information, a request for a report, a request for a file, etc.). For example, it may be determined that the first email 710 comprises a first request "Please send me the results of your last experiment".

Responsive to determining that the first email 710 comprises the first request, emails associated with the first email account 712 may be analyzed to determine whether an email comprising information associated with the first request has been transmitted to the second email account 708. In some examples, responsive to determining that an email comprising information associated with the first request was not transmitted to the second email account 708 by the first email account 712, it may be determined that the first email 710 is unanswered. Alternatively and/or additionally, responsive to determining that a reply email was not transmitted to the second email account 708 in response to the first email 710, it may be determined that the first email 710 is unanswered.

Figure 7B:
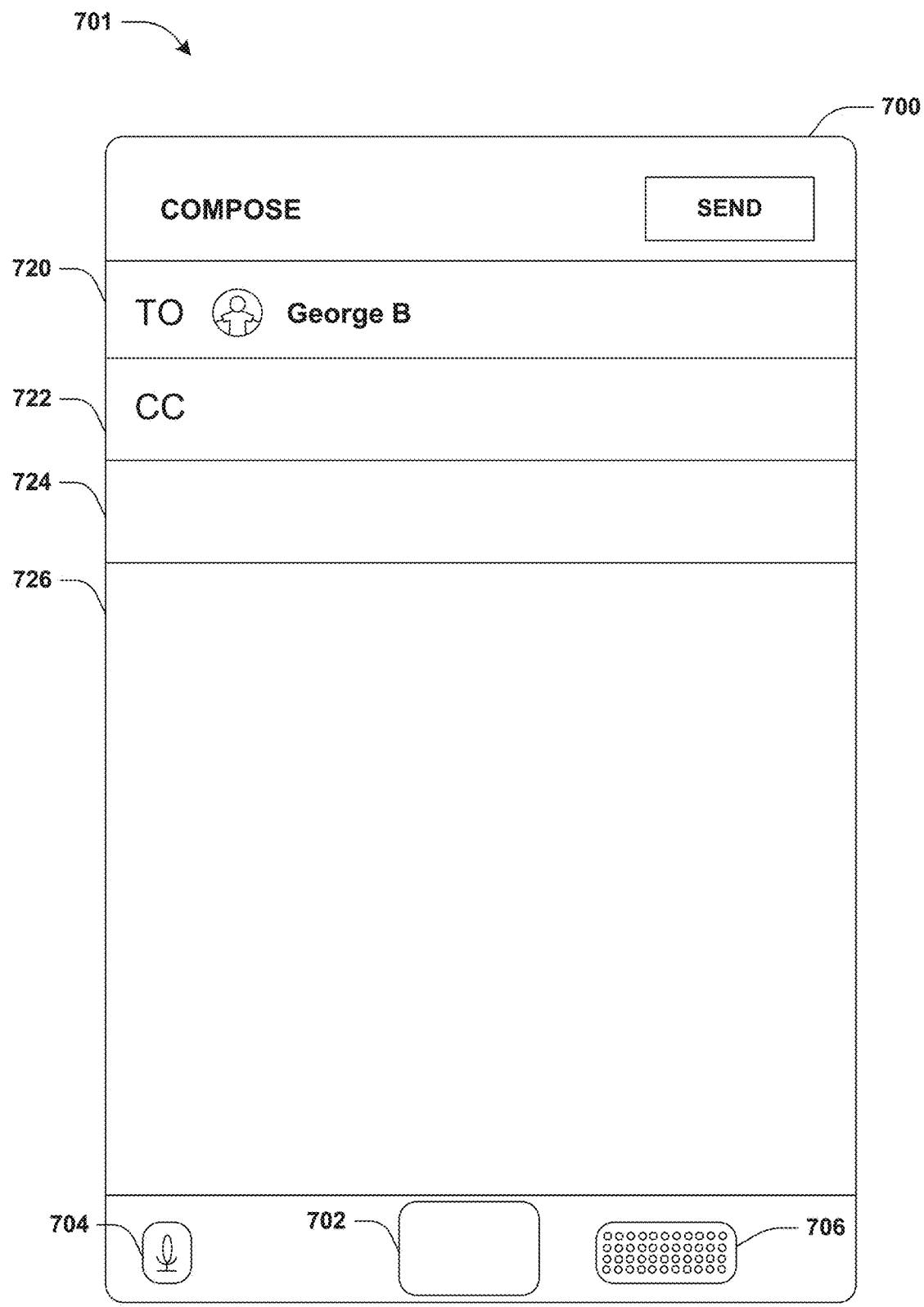
FIG. 7B is a component block diagram illustrating an example system for determining unanswered emails and/or displaying notifications indicative of the unanswered emails, where a graphical user interface of a first client device is controlled to display an email drafting interface for composing an email.

FIG. 7B illustrates a graphical user interface of the first client device 700 being controlled to display an email drafting interface for composing an email. For example, the email drafting interface may comprise a first email header field 720 (e.g., "TO") corresponding to first recipients of an email. Alternatively and/or additionally, the email drafting interface may comprise a second email header field 722 (e.g., "CC") corresponding to second recipients of an email. Alternatively and/or additionally, the email drafting interface may comprise a third email header field 724 corresponding to a subject line field of an email. Alternatively and/or additionally, the email drafting interface may comprise an email body field 726 corresponding to an email body of an email.

In some examples, it may be detected that an email address of the second email account 708 is inputted into the first email header field 720. Responsive to detecting the email address of the second email account 708 being inputted into the first email header field 720, a first notification 732 (illustrated in FIG. 7C) may be transmitted to the first client device 700. In some examples, the first notification 732 may be indicative of the first email 710 being unanswered.

Figure 7C:
FIG. 7C is a component block diagram illustrating an example system for determining unanswered emails and/or displaying notifications indicative of the unanswered emails, where a graphical user interface of a first client device is controlled to display a first notification.

FIG. 7C illustrates the graphical user interface of the first client device 700 being controlled to display the first notification 732. In some examples, the first notification 732 may comprise a first selectable input 734 corresponding to composing (e.g., drafting and/or transmitting) a first reply email in response to the first email 710. For example, a request to compose the first reply message may be received via a selection of the first selectable input 734.

Figure 7D:
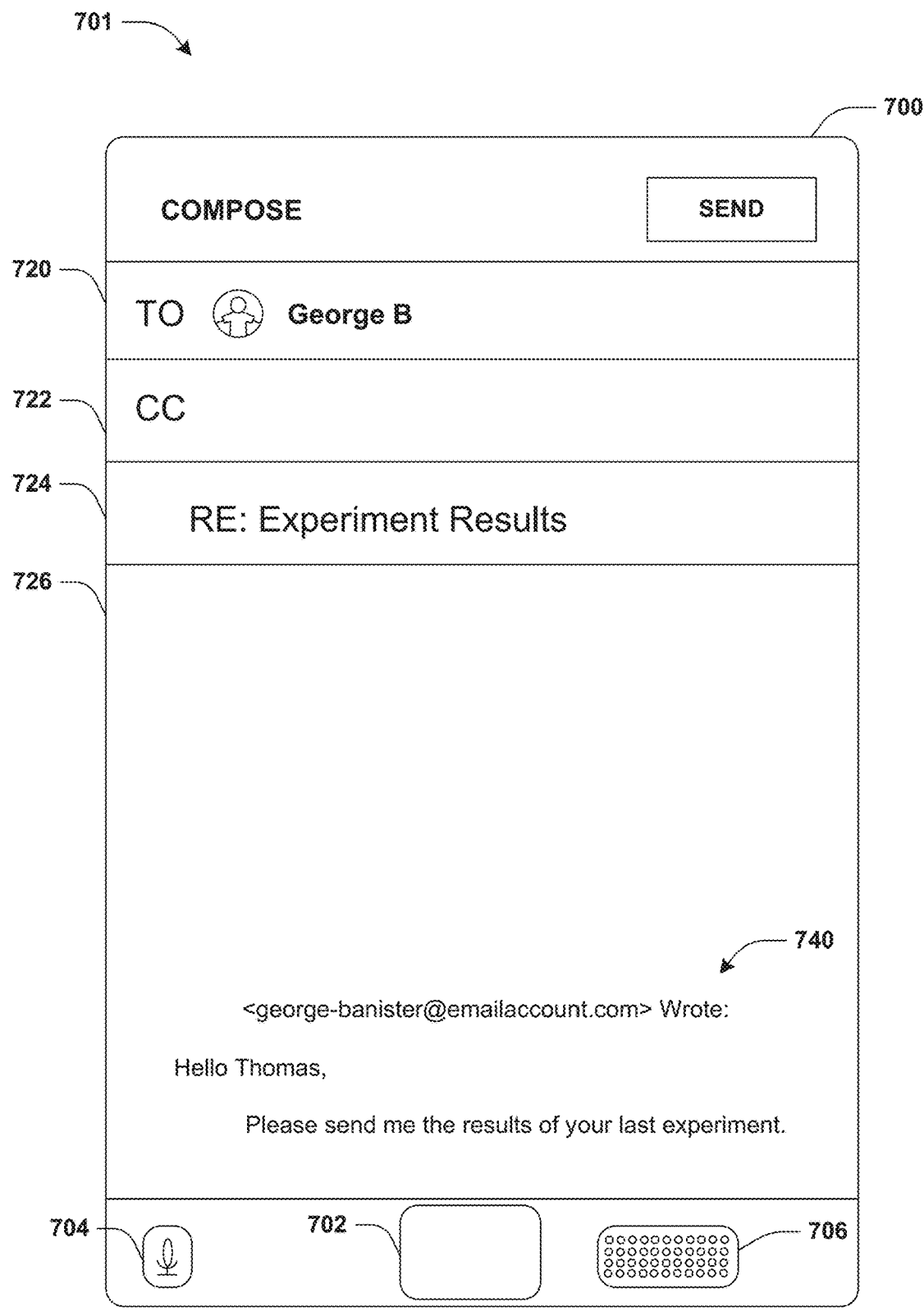
FIG. 7D is a component block diagram illustrating an example system for determining unanswered emails and/or displaying notifications indicative of the unanswered emails, where a graphical user interface of a first client device is controlled to display an email drafting interface for composing a first reply email.

FIG. 7D illustrates the graphical user interface of the first client device 700 being controlled to display the email drafting interface for composing the first reply email. In some examples, the first email header field 720 may comprise the email address of the second email account 708. Alternatively and/or additionally, the third email header field 724 may comprise a second subject line (e.g., "RE: Experiment Results") indicative of the first reply email being a response to the first email 710. Alternatively and/or additionally, an indication 740 of the first email body of the first email 710 may (automatically) be entered into the email body field 726 of the email drafting interface.

It may be appreciated that the disclosed subject matter may assist a user (e.g., and/or one or more client devices associated with the user) in interacting with a communication interface more conveniently and/or performing actions and/or tasks using the communication interface more quickly. Alternatively and/or additionally, it may be appreciated that the disclosed subject matter may assist the user in keeping track of received emails and/or unanswered emails.

Implementation of at least some of the disclosed subject matter may lead to benefits including, but not limited to, a reduction in screen space and/or an improved usability of a display (of the client device) (e.g., as a result of determining activity patterns based upon user activity with the communication interface, as a result of automatically performing actions associated with an activity pattern responsive to detecting activity associated with the activity pattern and/or determining that conditions associate with the activity pattern are met, wherein the user may not need to perform the actions manually, etc.).

Alternatively and/or additionally, implementation of at least some of the disclosed subject matter may lead to benefits including the user's experience being improved (e.g., as a result of automatically performing actions responsive to detecting activity associated with activity patterns which may make it easier for the user to perform tasks by improving an operating efficiency of the communication interface and/or the user, etc.).

Alternatively and/or additionally, implementation of at least some of the disclosed subject matter may lead to benefits including a reduction in screen space and/or an improved usability of the display (of the client device) (e.g., as a result of automatically identifying unanswered messages, as a result of displaying a notification of an unanswered message automatically, wherein the user may not need to open a separate window and/or navigate through messages to identify unanswered messages, etc.).

Alternatively and/or additionally, implementation of at least some of the disclosed subject matter may lead to benefits including reducing a probability that the user forgets about emails comprising requests for information and/or questions (e.g., as a result of automatically identifying unanswered messages, as a result of displaying a notification of an unanswered message automatically, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 8:
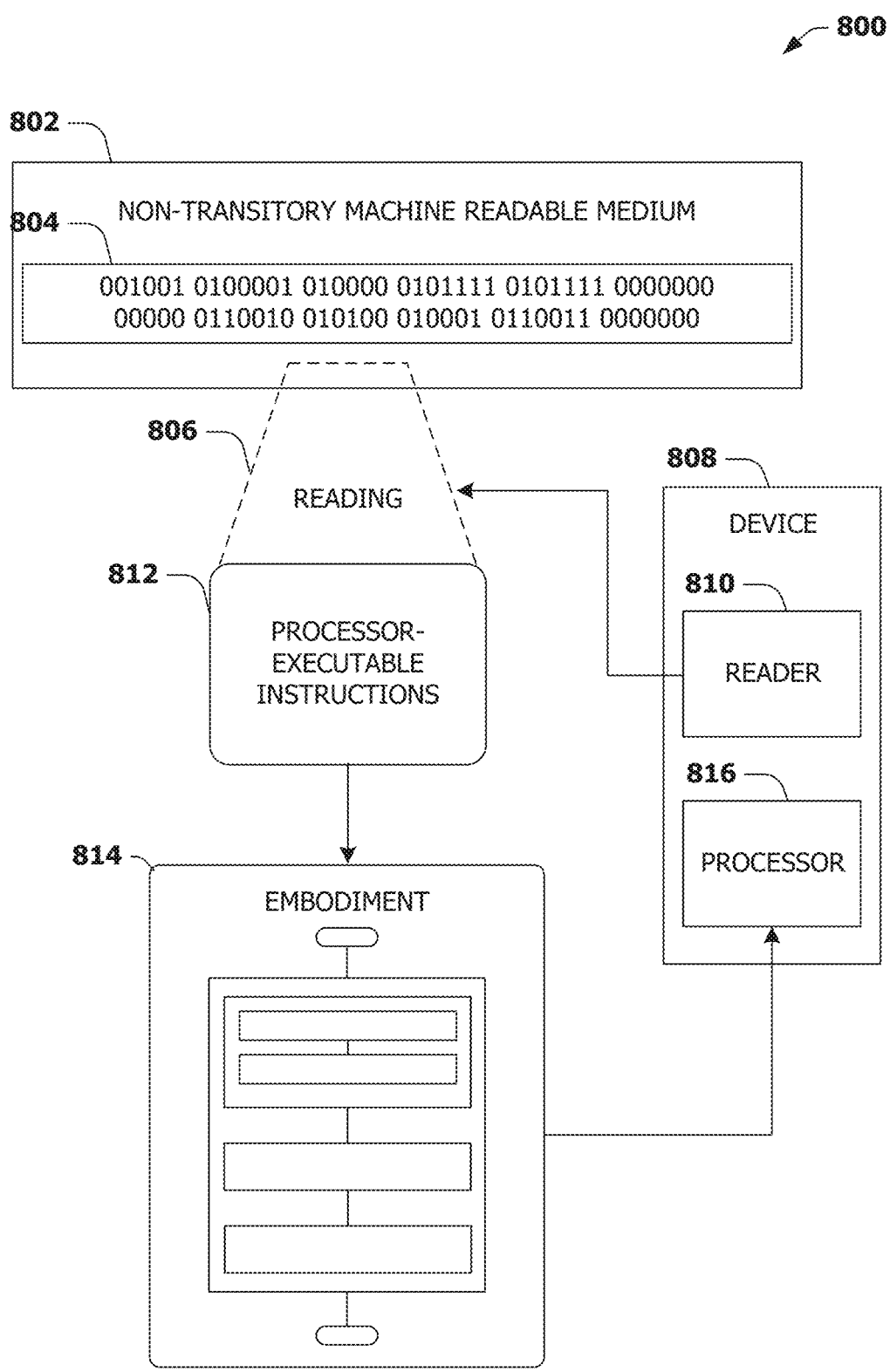
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4A, and/or the example method 450 of FIG. 4B, for example. In some embodiments, the processor-executable instructions 812 are configured to cause implementation of a system, such as at least some of the example system 501 of FIGS. 5A-5F, the example system 601 of FIGS. 6A-6C, and/or the example system 701 of FIGS. 7A-7D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    detecting first activity performed using a communication interface on a first client device associated with a first user account;
    analyzing the first activity to determine (i) a first activity pattern corresponding to one or more interactions with the communication interface and (ii) a first set of conditions corresponding to one or more actions being performed prior the first activity pattern;
    storing the first activity pattern in a first user profile associated with the first user account, wherein:
        the first user profile comprises a plurality of activity patterns; and
        each activity pattern of the plurality of activity patterns is associated with a set of conditions of a plurality of sets of conditions;
    determining that the first set of conditions are met during second activity performed using the communication interface;
    responsive to determining that the first set of conditions are met during the second activity, performing one or more operations, associated with the first activity pattern, comprising providing a notification;
    receiving, via a selection of a selectable input of the notification, a request to transmit a first message to a second user account;
    responsive to receiving the request to transmit the first message, extracting content comprising at least one of (i) first content from a set of messages transmitted as at least a portion of the first activity or (ii) second content from a second set of messages transmitted to the second user account;
    generating, based upon the content, the first message; and
    transmitting the first message to the second user account.

2. The method of claim 1, comprising:
    detecting a selection of a selectable input of the communication interface in the second activity, wherein the selectable input corresponds to at least one of opening an inbox, composing a message, displaying a message or labelling a message; and
    based upon the selection of the selectable input corresponding to the one or more actions being performed prior the first activity pattern, determining the one or more operations associated with the first activity pattern.

3. The method of claim 1, comprising:
    detecting a navigational action in the second activity, wherein the navigational action corresponds to at least one of accessing a part of the communication interface, accessing a resource associated with the first user account, opening the communication interface, navigating to an inbox of the first user account, navigating to a message drafting interface of the communication interface or navigating to a message associated with the first user account; and
    based upon the navigational action corresponding to the one or more actions being performed prior the first activity pattern, determining the one or more operations associated with the first activity pattern.

4. The method of claim 1, comprising:
    detecting an action in the second activity; and
    based upon the action corresponding to the one or more actions being performed prior the first activity pattern, determining the one or more operations associated with the first activity pattern.

5. The method of claim 1, comprising:
    detecting a drafting action in the second activity, wherein the drafting action corresponds to at least one of inputting a set of text into a message drafting interface, inputting one or more content items into the message drafting interface, attaching one or more files using the message drafting interface, transmitting a message to one or more user accounts, forwarding the message to one or more user accounts or deleting the message; and
    based upon the drafting action corresponding to the one or more actions being performed prior the first activity pattern, determining the one or more operations associated with the first activity pattern.

6. The method of claim 1, wherein:
    the set of messages are analyzed to determine a first type of message associated with the set of messages;
    the first activity pattern is indicative of transmission of messages of the first type; and
    the first set of conditions are indicative of one or more conditions that are met when messages of the set of messages are transmitted.

7. The method of claim 6, wherein the performing the one or more operations comprises:
    displaying a message drafting interface of the communication interface.

8. The method of claim 7, wherein the performing the one or more operations comprises:
    generating third content based upon the set of messages; and
    entering the third content into one or more content input areas of the message drafting interface.

9. The method of claim 8, wherein the generating the third content comprises:
    extracting first text from the set of messages;
    extracting second text from the second set of messages transmitted to the second user account; and
    generating, based upon the first text and the second text, a set of text, wherein the third content entered into the one or more content input areas comprises the set of text.

10. The method of claim 8, wherein the generating the third content comprises:
    extracting content items from the set of messages, wherein the content items comprise at least one of one or more videos or one or more images; and
    selecting, from the content items, a set of content items for inclusion in the third content entered into the one or more content input areas.

11. The method of claim 6, wherein the extracted content comprises both the first content and the second content.

12. The method of claim 6, wherein the determining that the first set of conditions are met comprises:
    detecting one or more sets of text being inputted into a message drafting interface of the communication interface; and
    analyzing the one or more sets of text to determine that the one or more sets of text are associated with the first type of message.

13. The method of claim 12, wherein the performing the one or more operations comprises:
    generating, based upon the first content, third content; and
    entering the third content into one or more content input areas of the message drafting interface.

14. A computing device comprising:

a processor; and memory comprising processor-executable instructions that when executed by the processor cause performance of operations, the operations comprising:

detecting first activity performed using a communication interface on a first client device associated with a first user account;

analyzing the first activity to determine (i) a first activity pattern corresponding to one or more interactions with the communication interface and (ii) a first set of conditions corresponding to one or more actions being performed prior the first activity pattern;

storing the first activity pattern in a first user profile associated with the first user account, wherein:

the first user profile comprises a plurality of activity patterns; and each activity pattern of the plurality of activity patterns is associated with a set of conditions of a plurality of sets of conditions;

determining that the first set of conditions are met during second activity performed using the communication interface;

responsive to determining that the first set of conditions are met during the second activity, performing one or more operations, associated with the first activity pattern, comprising providing a notification;

receiving, via a selection of a selectable input of the notification, a request to compose a first message;

extracting text from a set of messages transmitted as at least a portion of the first activity; and entering content, comprising the text, into one or more content input areas of a message drafting interface of the communication interface.

15. The computing device of claim 14, wherein the determining that the first set of conditions are met comprises:

analyzing the plurality of sets of conditions, based upon the second activity, to determine that the second activity is associated with the first set of conditions of the plurality of sets of conditions.

16. The computing device of claim 15, wherein:

the first activity pattern corresponds to messages of a first type being opened using the communication interface;

the first set of conditions corresponds to one or more actions being performed prior to messages of the first type being opened; and the second activity comprises the one or more actions being performed.

17. The computing device of claim 15, wherein the operations comprise:

extracting second text from a second set of messages transmitted to a second user account; and generating, based upon the text and the second text, a set of text, wherein the content entered into the one or more content input areas comprises the set of text.

18. A non-transitory machine readable medium having stored thereon processor-executable instructions that when executed cause performance of operations, the operations comprising:

detecting first activity performed using a communication interface on a first client device associated with a first user account;

analyzing the first activity to determine (i) a first activity pattern corresponding to one or more interactions with the communication interface and (ii) a first set of conditions corresponding to one or more actions being performed prior the first activity pattern;

storing the first activity pattern in a first user profile associated with the first user account, wherein:

the first user profile comprises a plurality of activity patterns; and each activity pattern of the plurality of activity patterns is associated with a set of conditions of a plurality of sets of conditions;

determining that the first set of conditions are met during second activity performed using the communication interface;

responsive to determining that the first set of conditions are met during the second activity, performing one or more operations, associated with the first activity pattern, comprising providing a notification;

receiving, via a selection of a selectable input of the notification, a request to compose a first message;

extracting content items from a set of messages transmitted as at least a portion of the first activity; and entering content, comprising the content items, into one or more content input areas of a message drafting interface of the communication interface.

19. The non-transitory machine readable medium of claim 18, wherein the determining that the first set of conditions are met comprises:

analyzing the plurality of sets of conditions, based upon the second activity, to determine that the second activity is associated with the first set of conditions of the plurality of sets of conditions.

20. The non-transitory machine readable medium of claim 18, wherein the operations comprise:

selecting, from the content items, a set of content items for inclusion in the content entered into the one or more content input areas.

* * * * *